US012663774B2

(12) United States Patent
Hall

(10) Patent No.: US 12,663,774 B2
(45) Date of Patent: *Jun. 23, 2026

(54) ROBOT ACCESS CONTROL AND GOVERNANCE FOR ROBOTIC PROCESS AUTOMATION

(71) Applicant: UiPath, Inc., New York, NY (US)

(72) Inventor: Andrew Hall, Bellevue, WA (US)

(73) Assignee: UiPath, Inc., New York, NY (US)

( * ) Notice: Subject to any disclaimer, the term of this patent is extended or adjusted under 35 U.S.C. 154(b) by 249 days.

This patent is subject to a terminal disclaimer.

(21) Appl. No.: 18/350,800

(22) Filed: Jul. 12, 2023

(65) Prior Publication Data

US 2023/0350373 A1      Nov. 2, 2023

Related U.S. Application Data

(63) Continuation of application No. 16/924,499, filed on Jul. 9, 2020, now Pat. No. 11,733,668.

(51) Int. Cl.
G05B 19/042          (2006.01)
G06F 21/62           (2013.01)

(52) U.S. Cl.
CPC ..... G05B 19/0426 (2013.01); G06F 21/6218 (2013.01); *G05B 2219/39059* (2013.01)

(58) Field of Classification Search
CPC .................... G06F 21/6218; G05B 2219/3905
See application file for complete search history.

(56) References Cited

U.S. PATENT DOCUMENTS 7,340,469 B1      3/2008  Alghathbar et al.
7,370,014 B1      5/2008  Vasavada et al.
(Continued)

FOREIGN PATENT DOCUMENTS

CN      103745161 A      4/2014
CN      108304714 A      7/2018
(Continued)

OTHER PUBLICATIONS

Jianrong, Tang, "Research on the Application of Robotic Process Automation in Enterprise Financial Shared Centers", School of Business, Changzhou University, Changzhou, Jiangsu 213164, China Academic Journal Electronic Publishing House, Issue 12, 2020.
(Continued)

*Primary Examiner* — Santosh R Poudel
(74) *Attorney, Agent, or Firm* — LeonardPatel PC; Michael A Leonard, II; Sheetal S. Patel

(57)          ABSTRACT

Robot access control and governance for robotic process automation (RPA) is disclosed. A code analyzer of an RPA designer application, such as a workflow analyzer, may read access control and governance policy rules for an RPA designer application and analyze activities of an RPA workflow of the RPA designer application against the access control and governance policy rules. When one or more analyzed activities of the RPA workflow violate the access control and governance policy rules, the code analyzer prevents generation of an RPA robot or publication of the RPA workflow until the RPA workflow satisfies the access control and governance policy rules. When the analyzed activities of the RPA workflow comply with all required access control and governance policy rules, the RPA designer application may generate an RPA robot implementing the RPA workflow or publish the RPA workflow.

21 Claims, 21 Drawing Sheets

(56) References Cited

U.S. PATENT DOCUMENTS

| | | | |
|---|---|---|---|
| 8,468,595 B1 | 6/2013 | Huang et al. | |
| 9,268,964 B1 | 2/2016 | Schepis et al. | |
| 9,817,967 B1 | 11/2017 | Shukla et al. | |
| 9,954,819 B2 | 4/2018 | Kakhandiki et al. | |
| 10,044,801 B1 | 8/2018 | Tyurumov et al. | |
| 10,270,644 B1 | 4/2019 | Valsecchi et al. | |
| 10,521,582 B2 | 12/2019 | Shukla et al. | |
| 10,691,113 B1 | 6/2020 | Bergman | |
| 10,733,329 B1 | 8/2020 | Ragupathy et al. | |
| 11,366,644 B1* | 6/2022 | Krebs | G06F 8/38 |
| 2001/0042045 A1 | 11/2001 | Howard et al. | |
| 2006/0080316 A1 | 4/2006 | Gilmore et al. | |
| 2006/0242077 A1 | 10/2006 | Dettinger et al. | |
| 2008/0235680 A1 | 9/2008 | Strauss et al. | |
| 2009/0138937 A1 | 5/2009 | Erlingsson et al. | |
| 2010/0333079 A1 | 12/2010 | Sverdlov et al. | |
| 2012/0072999 A1* | 3/2012 | Ishigo | G06F 21/10 |
| | | | 358/1.14 |
| 2012/0159566 A1 | 6/2012 | Hrastnik et al. | |
| 2012/0216243 A1 | 8/2012 | Gill et al. | |
| 2013/0055211 A1* | 2/2013 | Fosback | G06Q 10/06 |
| | | | 717/126 |
| 2013/0086696 A1 | 4/2013 | Austin | |
| 2014/0019488 A1 | 1/2014 | Wo et al. | |
| 2015/0242389 A1 | 8/2015 | Morrissey | |
| 2016/0088019 A1 | 3/2016 | Li et al. | |
| 2016/0119304 A1 | 4/2016 | Lelcuk et al. | |
| 2017/0053130 A1 | 2/2017 | Hughes et al. | |
| 2017/0249130 A1 | 8/2017 | Smiljanic et al. | |
| 2017/0372442 A1 | 12/2017 | Mejias | |
| 2018/0197123 A1 | 7/2018 | Parimelazhagan et al. | |
| 2018/0203994 A1 | 7/2018 | Shukla et al. | |
| 2018/0278552 A1 | 9/2018 | Quock et al. | |
| 2018/0337927 A1 | 11/2018 | Carnahan et al. | |
| 2019/0068630 A1 | 2/2019 | Valecha et al. | |
| 2019/0124100 A1* | 4/2019 | Shannon | G06F 21/53 |
| 2019/0147382 A1 | 5/2019 | Krishnamurthy | |
| 2020/0026263 A1 | 1/2020 | Haberkern et al. | |
| 2020/0047334 A1 | 2/2020 | Mummigatti et al. | |
| 2020/0057951 A1 | 2/2020 | Soni et al. | |
| 2020/0065334 A1 | 2/2020 | Rodriguez et al. | |
| 2020/0067923 A1 | 2/2020 | Dasari et al. | |
| 2020/0097676 A1 | 3/2020 | Margel et al. | |
| 2020/0111023 A1 | 4/2020 | Murugappan et al. | |
| 2020/0134374 A1* | 4/2020 | Oros | G06N 20/00 |
| 2020/0180155 A1 | 6/2020 | Hall et al. | |
| 2020/0184087 A1 | 6/2020 | Nos et al. | |
| 2020/0364363 A1 | 11/2020 | Vanover | |
| 2021/0111885 A1 | 4/2021 | Kubovcik et al. | |
| 2021/0129325 A1 | 5/2021 | Yu et al. | |
| 2021/0191760 A1 | 6/2021 | Madkour | |
| 2021/0288823 A1 | 9/2021 | Foth et al. | |
| 2021/0357236 A1 | 11/2021 | Cohen et al. | |
| 2022/0011732 A1 | 1/2022 | Hall | |
| 2022/0011734 A1 | 1/2022 | Hall | |
| 2022/0043842 A1 | 2/2022 | Saraf et al. | |

FOREIGN PATENT DOCUMENTS

| | | | | |
|---|---|---|---|---|
| CN | 108724201 A | 11/2018 | | |
| CN | 109102145 A | 12/2018 | | |
| CN | 109598427 A | 4/2019 | | |
| CN | 110428233 A | 11/2019 | | |
| CN | 110780965 A | 2/2020 | | |
| CN | 111242577 A | 6/2020 | | |
| EP | 0547741 A1 | 6/1993 | | |
| EP | 1879136 A1 | 1/2008 | | |
| EP | 3620999 A1 | 3/2020 | | |
| JP | 2008269632 A | 11/2008 | | |
| JP | 2014099020 A | 5/2014 | | |
| JP | 2016091116 A | 5/2016 | | |
| JP | 2016215303 A | 12/2016 | | |
| JP | 2017163557 A | 9/2017 | | |
| JP | 2019079364 A | 5/2019 | | |
| JP | 2020057166 A | 4/2020 | | |
| JP | 2020091512 A | 6/2020 | | |
| KR | 20080000086 A | * | 1/2008 | G06F 21/50 |
| KR | 20180058563 A | 6/2018 | | |
| KR | 20180128727 A | 12/2018 | | |
| TW | 1690866 B | 4/2020 | | |
| WO | 03100581 A2 | 12/2003 | | |

OTHER PUBLICATIONS

Notice of Allowance, issued Feb. 28, 2025, JP Patent Application No. 2020-553459.

Notice of Allowance, issued Mar. 17, 2025, JP Patent Application No. 2020-553462.

Notice to Grant a Patent, issued Apr. 3, 2025, CN Patent Application No. 202080002308.3.

Office Action Search Report, issued Sep. 12, 2024, CN Patent Application No. 202080002308.3.

Search Report, issued Apr. 3, 2025, CN Patent Application No. 202080002308.3.

Notice of Allowance, issued Feb. 3, 2025, TW Patent Application No. 109133856.

Office Action, issued Jan. 15, 2025, CN Patent Application No. 202080002308.3.

Search Report, issued Jan. 15, 2025, CN Patent Application No. 202080002308.3.

Search Report, issued Oct. 30, 2024, CN Patent Application No. 202080002325.7.

Notice of Allowance, issued Jun. 28, 2024, TW Patent Application No. 109133857.

Office Action, issued Oct. 30, 2024, CN Patent Application No. 202080002325.7.

Office Action, issued Sep. 12, 2024, CN Patent Application No. 202080002308.3.

Zhang, Chuanhua, "Research on MAC Mode Access Control Strategy Based on PMI", School of Information Security, Shanghai Jiao Tong University, Aug. 1, 2006.

Notification of Reasons for Refusal, issued Sep. 17, 2024, JP Patent Application No. 2020-553459.

Notification of Reasons for Refusal, issued Sep. 17, 2024, JP Patent Application No. 2020-553462.

Decision on Appeal, issued Mar. 29, 2024, U.S. Appl. No. 16/941,484.

Jason D Mitchell, "Notice of Allowance", issued Apr. 23, 2024, U.S. Appl. No. 16/941,484.

Office Action issued in Taiwanese Application No. 109133856 on May 29, 2024.

"CheckMATE for RPA & RDA," available at https://web.archive.org/web/20190713104010/http://www.tobeware.com/board/download/rp_infor.pdf (Jul. 13, 2019).

Decision Dismissing Appeal issued in Korean Application No. 10-2020-7028097 on May 31, 2023.

European Search Report issued in EP Application No. 20199194 on Feb. 19, 2021.

European Search Report issued in EP Application No. 20199207 on Feb. 24, 2021.

Final Office Action issued in Korean Application No. 10-2020-7028097 on Jul. 1, 2022.

International Search Report & Written Opinion, issued Apr. 1, 2021, PCT Application No. PCT/US20/52174.

International Search Report & Written Opinion, issued Apr. 8, 2021, PCT Application No. PCT/US20/52183.

Jason D Mitchell, "Examiner's Answer", issued Jul. 10, 2023, U.S. Appl. No. 16/941,484.

Jason D Mitchell, "Final Office Action", issued Feb. 2, 2023, U.S. Appl. No. 16/941,484.

Jason D Mitchell, "Non-Final Office Action", issued Sep. 29, 2022, U.S. Appl. No. 16/941,484.

Microsoft Group Policy API Page available at https://docs.microsoft.com/en-us/previous-versions/windows/desktop/Policy/group-policy-start-page (May 31, 2018).

Notice of Allowance issued in Korean Application No. 10-2020-7028125 on Sep. 5, 2022.

(56)                  References Cited

OTHER PUBLICATIONS

Office Action issued in European Application No. 20199194.0 on Mar. 9, 2023.
Office Action issued in European Application No. 20199207.0 on Mar. 9, 2023.
Office Action issued in Korean Application No. 10-2020-7028097 on Nov. 15, 2021.
Office Action issued in Korean Application No. 10-2020-7028125 on Apr. 15, 2022.
Office Action issued in Korean Patent Application No. 10-2020-7028125 on Oct. 28, 2021.
Parikh, "Robotic Process Automation (RPA) is set to transform risk and regulatory compliance in banking and financial services, May 23, 2018, Nividous, https://nividous.com/blogs/ rpa-transforming-risk-regulatory-compliance-in-banking-financial-services" (2018).
Santosh Raj Poudel, "Final Office Action", issued Nov. 7, 2022, U.S. Appl. No. 16/924,499.
Santosh Raj Poudel, "Non-Final Office Action", issued Apr. 28, 2022, U.S. Appl. No. 16/924,499.
Santosh Raj Poudel, "Notice of Allowance", issued Apr. 19, 2023, U.S. Appl. No. 16/924,499.
Office Action, issued May 8, 2025, CN Patent Application No. 202080002325.7.
Search Report, issued May 8, 2025, CN Patent Application No. 202080002325.7.
Notice of Allowance, issued Jul. 28, 2025, CN Patent Application No. 202080002325.7.
Office Action, issued Aug. 22, 2025, EP Patent Application No. 20199194.0.
Office Action, issued Aug. 25, 2025, EP Patent Application No. 20199207.0.
Office Action issued in Taiwanese Application No. 109133857 on Oct. 17, 2023.

* cited by examiner

Figure 1:
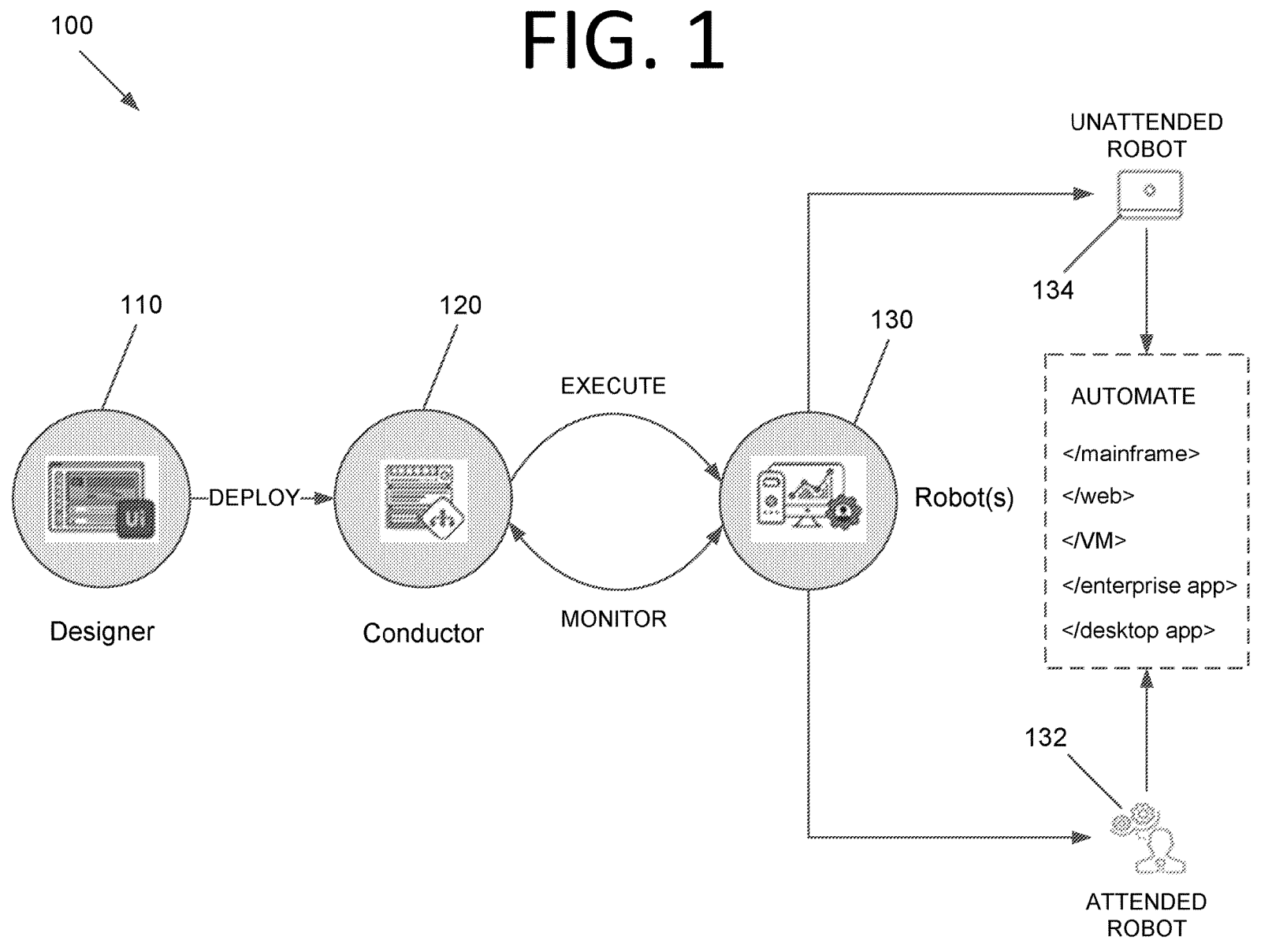

DEPLOY

Designer

120

EXECUTE

MONITOR

Conductor

130

Robot(s)

134

UNATTENDED
ROBOT

AUTOMATE

</mainframe>

</web>

</VM>

</enterprise app>

</desktop app>

132

ATTENDED
ROBOT

Figure 5:
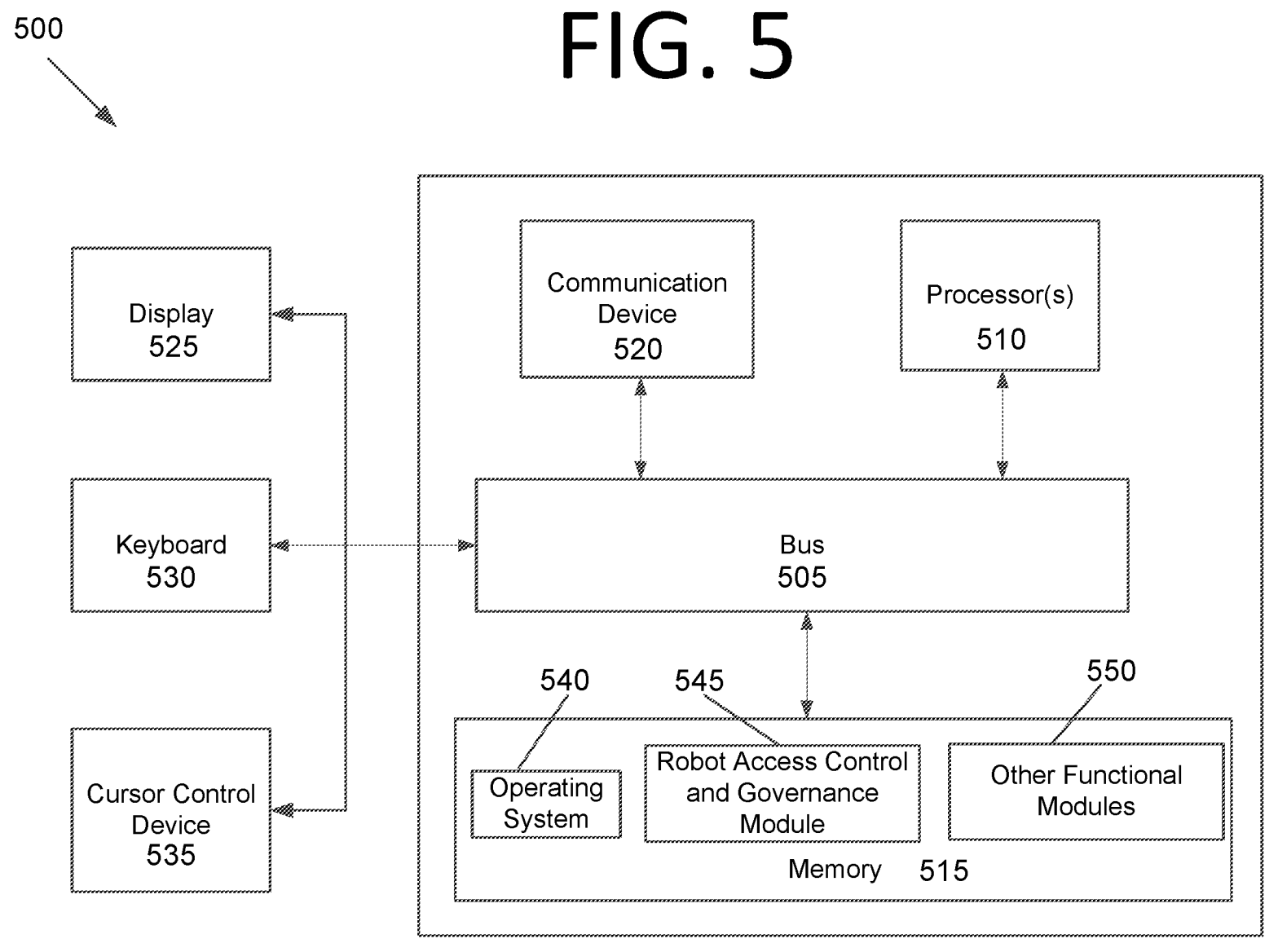

Processor(s)
510

Communication
Device
520

Bus
505

Display
525

Keyboard
530

Cursor Control
Device
535

Operating
System
540

Robot Access Control
and Governance
Module
545

Other Functional
Modules
550

Memory    515

700

710

900

910

1200

Use Browser Chrome: Robotic Process Automation | UiPath

Browser URL https://www.uipath.com/

1210

Use Outlook Account

Account

Default Email Account

Reference as

Outlook

Send Outlook Email

Account

Outlook

To me@mailinator.com

Cc

Select a value

Subject

Select a value

1220

Body ⦿ Text ○ Use Word Document

Select a value

☐ Save as draft

1200

Browser URL https://www.uipath.com/

1210

Use Outlook Account

Account

Default Email Account

Reference as

Outlook

Send Outlook Email

Account

Outlook

To me@mailinator.com

Cc

Select a value

Subject

Select a value

Body ⦿ Text ◯ Use Word Document

1220

Select a value

☐ Save as draft

Attachments ⦿ Files ◯ Folder

Select a value

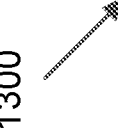

Error List

| Scope: ▶ | Project | ▶ | Rule: | All Rules | ▶ |

| | Code | Name | Description | File |
|---|---|---|---|---|
| ▷ ⚠ | ORG-USG-001 | Activity Property Requirements | 'Save as draft' property of the UiPath.Mail.Activities.Business.SendMailX' activity does not meet your organization's guidelines | Main.xaml |
| ▷ ⚠ | UX-SEC-010 | App/Url Restrictions | UI automation detected on 'https://www.uipath.com' which is not an allowed application as defined by your organization | Main.xaml |

FIG. 14
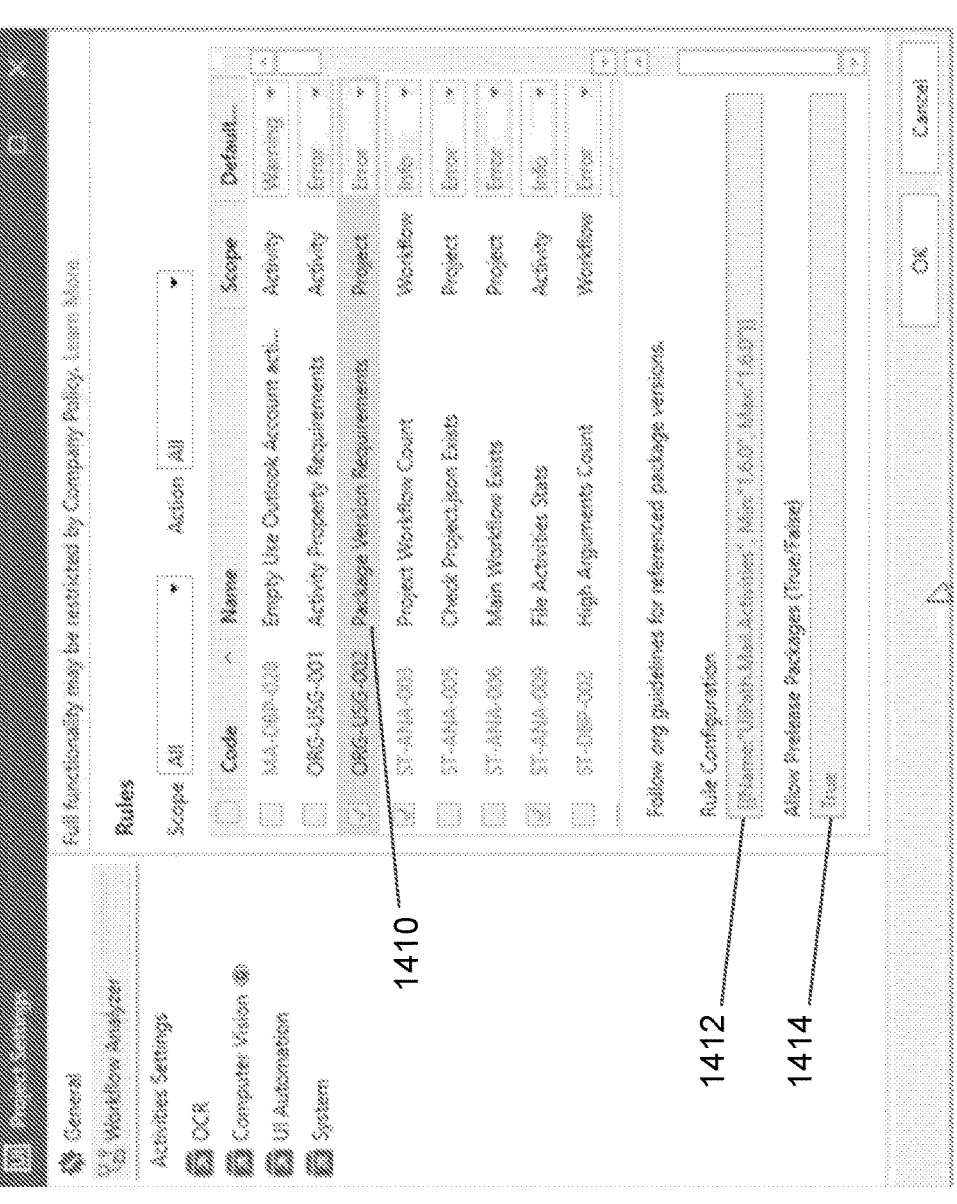
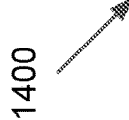

1600

START

1605 — Determine Link to Policy Rules File

1610 — Download Policy Rules File

1615 — Read Policy Rules from File

1620 — Display Interfaces and Prevent User Modifications

1625 — Analyze Activities of RPA Workflow against Policy Rules

1630 — Validated?

1640 — Wait for Modifications to RPA Workflow

NO

YES

1635 — Generate RPA Robot or Publish RPA Workflow

END

1700

ROBOT ACCESS CONTROL AND GOVERNANCE FOR ROBOTIC PROCESS AUTOMATION

CROSS-REFERENCE TO RELATED APPLICATION

This application is a continuation of, and claims priority to, U.S. patent application Ser. No. 16/924,499 filed on Jul. 9, 2020. The subject matter of this earlier filed application is incorporated by reference in its entirety.

FIELD

The present invention generally relates to robotic process automation (RPA), and more specifically, to robot access control and governance for RPA.

BACKGROUND

Certain actions taken by users of computing systems may violate laws or agreements in the U.S. and other countries, such as the E.U. General Data Protection Regulation (GDPR), the U.S. Health Insurance Portability and Account-ability Act (HIPAA), third party terms of service, etc. Penalties for violation of these laws or agreements can be massive. For instance, with the GDPR, lower-level viola-tions can merit a fine of €10 million or two percent of the violator's worldwide annual revenue (not profits), which-ever is higher. A more serious violation can result in a fine of €20 million, or four percent of the violator's annual revenue, whichever is higher. These fines can be financially damaging to a company or even fatal. RPA presents a unique challenge to access control and governance. Accordingly, improved approaches to RPA access control and governance may be beneficial.

SUMMARY

Certain embodiments of the present invention may pro-vide solutions to the problems and needs in the art that have not yet been fully identified, appreciated, or solved by current RPA technologies. For example, some embodiments of the present invention pertain to robot access control and governance for RPA.

In an embodiment, a computer program for performing robot access control and governance for RPA is embodied on a non-transitory computer-readable medium. The computer program configured to cause at least one processor to read access control and governance policy rules for an RPA designer application and analyze activities of an RPA work-flow of the RPA designer application against the access control and governance policy rules. When one or more analyzed activities of the RPA workflow violate the access control and governance policy rules, the computer program is configured to cause the at least one processor to prevent generation of an RPA robot or publication of the RPA workflow until the RPA workflow satisfies the access control and governance policy rules. When the analyzed activities of the RPA workflow comply with all required access control and governance policy rules, the computer program is con-figured to cause the at least one processor to generate an RPA robot implementing the RPA workflow or publish the RPA workflow.

In another embodiment, a computer-implemented method for performing robot access control and governance for RPA includes analyzing activities of an RPA workflow of an RPA designer application against access control and governance policy rules, by a code analyzer. When one or more analyzed activities of the RPA workflow violate the access control and governance policy rules, the computer-implemented method includes preventing generation of an RPA robot or publica-tion of the RPA workflow until the RPA workflow satisfies the access control and governance policy rules, by the code analyzer.

In yet another embodiment, a computer program for performing robot access control and governance for RPA is embodied on a non-transitory computer-readable medium. The computer program configured to cause at least one processor to determine a link to a file comprising access control and governance policy rules from a registry entry of a computing system and download the file using the deter-mined link, or download the governance policy rules from a conductor application. The computer program is also con-figured to cause the at least one processor to read the access control and governance policy rules for an RPA designer application from the downloaded file and analyze activities of an RPA workflow of the RPA designer application against the access control and governance policy rules. When one or more analyzed activities of the RPA workflow violate the access control and governance policy rules, the computer program is configured to cause the at least one processor to prevent generation of an RPA robot or publication of the RPA workflow until the RPA workflow satisfies the access control and governance policy rules. When the analyzed activities of the RPA workflow comply with all required access control and governance policy rules, the computer program is configured to cause the at least one processor to generate an RPA robot implementing the RPA workflow or publish the RPA workflow. The access control and gover-nance policy rules comprise one or more application and/or universal resource locator (URL) restrictions, one or more package restrictions, one or more activity restrictions, one or more activity property requirements, or a combination thereof.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodi-ments of the invention and are not therefore to be considered to be limiting of its scope, the invention will be described and explained with additional specificity and detail through the use of the accompanying drawings, in which:

FIG. 1 is an architectural diagram illustrating a robotic process automation (RPA) system, according to an embodi-ment of the present invention.

FIG. 5 is an architectural diagram illustrating a computing system configured to perform robot access control and governance for RPA, according to an embodiment of the present invention.

FIG. 13 illustrates an error list interface, according to an embodiment of the present invention.

FIG. 14 is a screenshot illustrating a workflow analyzer interface, according to an embodiment of the present invention.

Unless otherwise indicated, similar reference characters denote corresponding features consistently throughout the attached drawings.

DETAILED DESCRIPTION OF THE EMBODIMENTS

Figure 2:
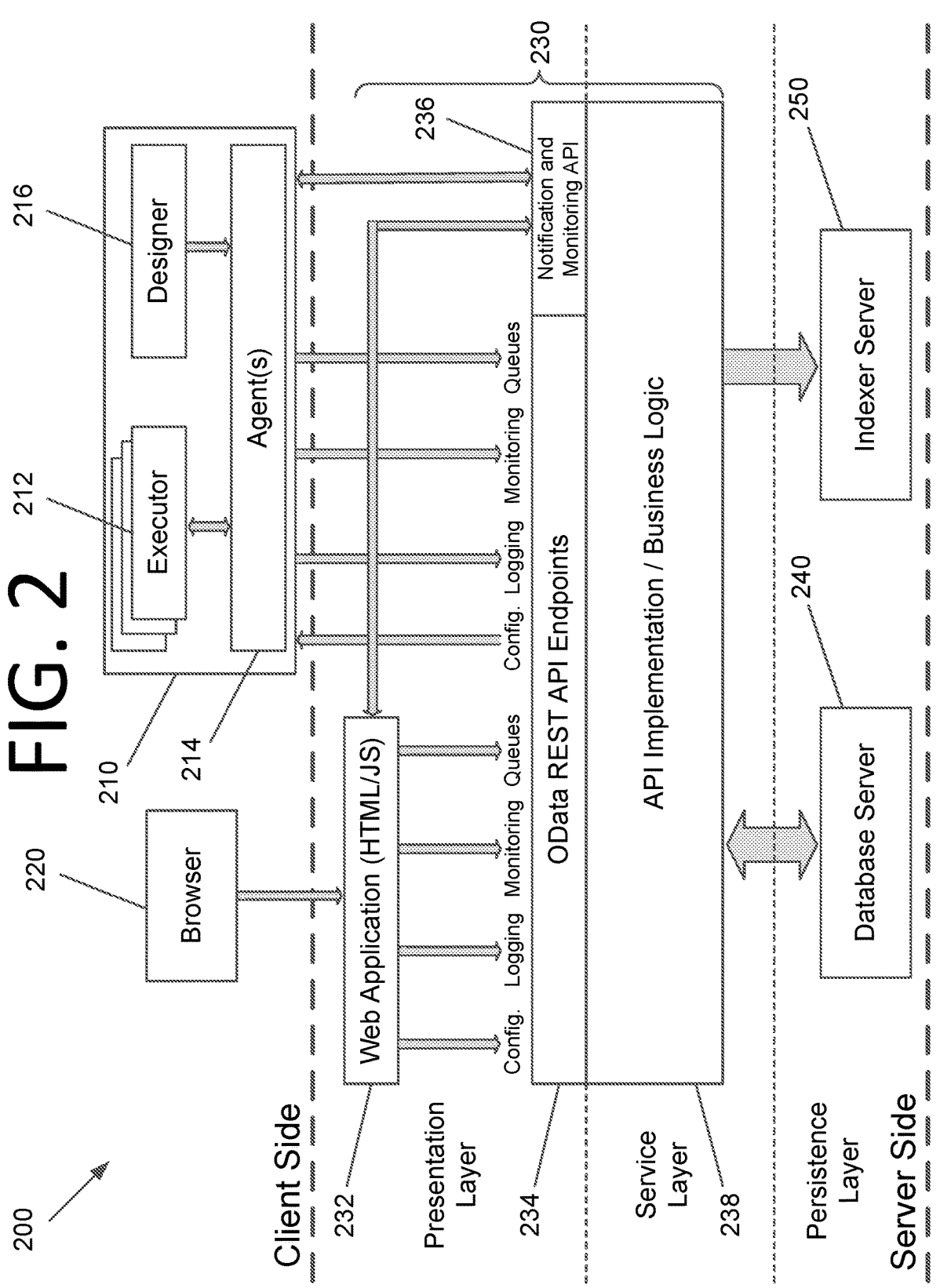
FIG. 2 is an architectural diagram illustrating a deployed RPA system, according to an embodiment of the present invention.

Some embodiments pertain to robot access control and governance for RPA. RPA governance is the ability for organizations to put policies in place to prevent users from developing RPA robots capable of taking actions that may harm the organization, such as violating GDPR, HIPAA, third party application terms of service, etc. Since developers may create RPA robots that violate privacy laws, terms of service, etc. while performing their automations, some embodiments implement access control and governance restrictions at the robot and/or robot design application level. This may provide an added level of security and compliance into the RPA process development pipeline in some embodiments by preventing RPA developers from taking dependencies on unapproved software libraries that may either introduce security risks or work in a way that violates policies, regulations, privacy laws, and/or privacy policies.

Some embodiments prevent RPA robots from taking actions that are allowed by the user but not by a robot. Traditionally, organizations can control what a user may and may not do through access control to their systems. However, in the context of RPA, and especially attended automation, this control may break down. The robot performs tasks on behalf of the user, which means that the backend system is unable to distinguish that a robot is accessing the system versus a user.

This can be problematic for several reasons. For example, backend systems may allow the user to access certain data that could be misused. However, good system design typically makes it difficult for the user to cause issues at any scale because doing something they should not is slow and tedious. By contrast, if an RPA robot is used, the robot can greatly increase the scale of the data misuse or policy violation due to its speed of execution.

Consider the following examples. An organization uses a customer relationship management (CRM) system for contacting customers that fully supports various privacy options, such as the "opt out" and "forget me" policies of GDPR and other user protection laws by checking whether a user has chosen the "do not contact me" option and providing links to privacy policies and instructions for requesting for an organization to "forget them". The organization has chosen to give a broad portion of employees access to the CRM system, but to only give a select few employees permissions to send emails in the system.

However, legitimate business purposes however require that this broader set of users have access to customer profiles, which include their email address (e.g., the employee may create or edit misinformation including the customer's email address in the system when working with a customer). It is an organizational policy violation to email a customer not using the CRM system, but some employees are looking to learn some information and do not want to wait for the various approval channels to gain those permissions or have an appropriately permissioned employee do so on their behalf. Without an RPA robot, the employees can still violate this policy, but because it is tedious to manually copy and paste email addresses one-by-one out of the system. Even if employees violate this policy, the scale of the violation will be small, and therefore, mitigate the risk to the organization if any violation happens. However, an RPA robot can extract this data many orders of magnitude faster than a human (e.g., thousands of times faster, tens of thousands of times faster, hundreds of thousands of times faster, millions of times faster, etc.) to create and send the emails, so where a user may manually send 5-10 emails violating the policy and open the company up to risk of violating a GDPR "opt out" by the customer, if the user creates a robot to this, they could send a large number of violating emails.

As another example, consider a healthcare organization that uses carefully protected systems to store all data in a HIPAA compliant manner. Employees may legitimately access and work with this data in the context of the appropriate application(s). An employee who is frustrated with the inefficiency of the system may want to write an RPA robot that extracts patient data into an unprotected Excel® spreadsheet on his or her desktop. This is now a HIPAA violation, and if something were to happen to that data, such as the employee's computer being stolen and accessed, this could open the organization up to significant financial and legal liability.

As yet another example, consider the case where the terms of service for a third party application or service prohibit using automation to work with the application or service. If an employee chooses to write an RPA robot that works against these terms of service, the company could be legally liable.

These problems and others may present substantial risks to organizations employing RPA robots. However, some embodiments reduce or eliminate security and compliance risks from developers by preventing developers from using unapproved library and activity references. An RPA developer, whether a trained RPA developer (e.g., using UiPath Studio™) or an untrained citizen developer (e.g., using UiPath StudioX™) may add references to libraries that are either considered unsafe or work in a manner that violates policy/regulatory rules.

Consider the following examples. The United States government does not allow the use of technology developed in Russia or other countries considered to be unfriendly to be installed on U.S. government computing systems. There are, however, some common libraries used in RPA that have been developed by Russian companies (e.g. the Abbyy® OCR engine). While developers can choose to not have these libraries available by default on their computing systems, they cannot explicitly prevent a user from taking a dependency incorporating these libraries in an RPA project. While Internet access for RPA developers may be blocked, which is not desirable for many reasons when developing software, a developer could still bring the unapproved libraries to the computing system via another mechanism, such as a universal serial bus (USB) stick.

As another example, many financial institutions have strict policies in place regarding what information may and may not leave their internal networks and firewalls. In the modern era, many RPA libraries (called via RPA activities) work by communicating with servers on public clouds, such as UiPath® document understanding activities. These financial institutions are concerned that users will not realize that using these activities is not allowed because they may send sensitive data outside the company firewall. However, there are no previously existing effective options to prevent this from happening.

Still another concern is preventing RPA at scale from overwhelming systems. One of the reasons for the massive success of RPA is that it enables automation of legacy systems without requiring upgrades to those systems. Because legacy systems were not designed to be automated, their design and performance may only be capable of handling interactions at the speed at which humans can work. However, legacy applications are not always able to keep up with the speed at which an RPA robot may interact with the system. A robot that is not designed to operate within these constraints may essentially end up overwhelming legacy systems with faster requests than they can process, essentially performing an accidental denial of service (DoS) attack on the system. While settings exist in UiPath Studio™, that enable delays between activities, there is no currently existing central enforcement mechanism to ensure that developers use these settings when working with legacy systems that are not capable of operating at RPA robot speeds.

Yet another concern is ensuring organizational policy compliance. Many organizations have specific rules that they want to apply to automations. For instance, some examples include enforcing that emails created by automation are only sent to internal employees and not external recipients, enforcing that all emails created by automation are saved as a draft and not sent without human review, etc. Without appropriate governance, these policies may be violated by RPA robots.

To address various problems access control and governance problems that may occur in RPA, some embodiments provide the ability for organizations to define and enforce governance policies. For example, this may be implemented via a JavaScript Object Notation (JSON) file that defines what an RPA robot can and/or cannot access. In some embodiments, organizations may place controls on what applications and/or universal resource locators (URLs) may and/or may not be automated, place controls on what activities may and/or may not be used, place controls on what packages (e.g., libraries) may and/or may not be used, provide the ability to create and deploy custom rules that expand the governance capabilities, provide various RPA designer application settings that may control, for example, which package feeds users may use to install libraries from, etc.

In some embodiments, governance may be enforced at design time (i.e., when the developer is building, testing, and revising the RPA robot workflow). However, this may make it difficult or impossible to enforce certain policies. For instance, it may be difficult or impossible to enforce policies where the value that the policy is being applied to is only known at runtime. If an organization desires to put a policy in place preventing the access to certain websites, for instance, the design time analysis should be able to know the URL to flag. However, it is possible to construct the RPA program in such a way in some embodiments that the value is loaded from a dynamic source, such as an external file or a prompt asking the user. In this case, design time analysis is not sufficient since the value that violates the policy is not known at design time. Another example is if an organization desires to prevent automating email to customers outside the organization, but the list of email addresses comes from a spreadsheet. In this case, the emails are not known at design time, but are instead a dynamic input to the system that should be evaluated at runtime.

In certain embodiments, governance is enforced at runtime in addition to or in lieu of design time enforcement. This may be accomplished via a server-side application for configuring and deploying policies, for example. Policies may be automatically sent to user computing systems when these computing systems connect to a server-side conductor application, for example. The RPA designer application may automatically insert code into the RPA robots that forces them to obtain these policies and operate in compliance therewith.

In some embodiments, controls may be defined for an RPA designer application based on the organization, role, group, the individual developer, etc. to control what developers may do when developing RPA robots. Policies may be defined and controls may be enforced to control what an RPA robot may do when running an automation. Such embodiments may enable organizations to better meet their compliance and governance requirements with respect to laws, regulations, agreements, and company policies.

In some embodiments, local files can only be modified by administrator. As such, non-administrator users should not be able to override or change these files. Package feeds may be locked down such that only desired feeds are available and additional feeds cannot be added. This prevents users from using packages that are obtained elsewhere. In certain embodiments, a "send feedback" tool may be disabled as part of the policy.

A "package feed", as used herein, is a location (either remote or local) that contains access to additional libraries that the developer may optionally choose to install to gain additional capabilities for his or her automation project. A library, as used herein, is a package containing computer code that provides additional capabilities (e.g., activities) to a project. An example of a package feed is the UiPath Connect™ marketplace. This is an open location where community members may upload libraries including custom activities that they have written. If a UiPath® RPA developer wishes to use these capabilities, that developer can browse and add library references to his or her projects. An example of a library is the UiPath GSuite™ activities. The default installation of UiPath Studio™ does not give RPA developers the ability to work with GSuite™. However, developers may install the GSuite™ activity library that now gives that project the ability to use activities for working with Gsuite™ (e.g., Gmail®, Google® Sheets, Google® Drive, etc.).

In some embodiments, a code analyzer, such as a program analyzer or an RPA workflow analyzer, is provided as an audit function for the RPA designer application. The workflow analyzer may define what is permitted for users when they run the RPA designer application and may enforce policies. For instance, permitted URLs may be specified that a user may work with, certain URLs may be restricted, etc.

As used herein, a "code analyzer" is computer code that runs a series of rules that inspect the code written by the RPA user and produce feedback (e.g., messages, warnings, errors, etc.) when the application does not satisfy the rules. In some embodiments, the code analyzer is provided by the vendor of the RPA application (e.g., UiPath®) or written by customers using the RPA application. An example of a code analyzer rule is the "App/Url Restrictions" rule in UiPath Studio™ that allows organizations to define what desktop applications and website URLs may or may not be used in an automation project. If the user breaks one of these rules, he or she will receive a notification at the severity specified in the governance policy. In some embodiments, this is usually an error that will prevent the automation from being published or run.

Certain embodiments may be employed for robotic process automation (RPA). FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, FSMs, and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows.

FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point, or one of the aggregation points, with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, versioning, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Versioning may include management of unique instances of some process or configuration in some embodiments. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
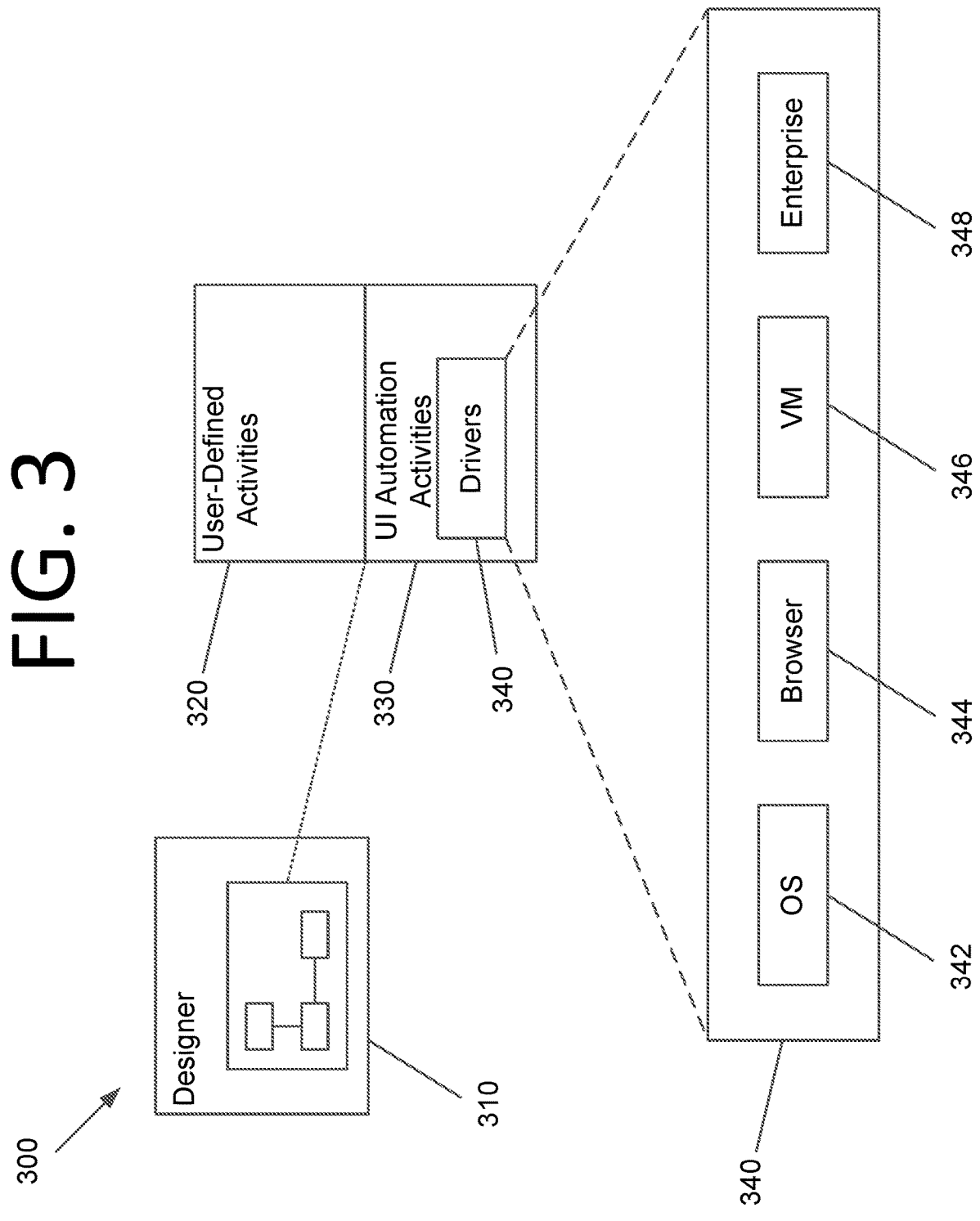
FIG. 3 is an architectural diagram illustrating the rela-tionship between a designer, activities, and drivers, accord-ing to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
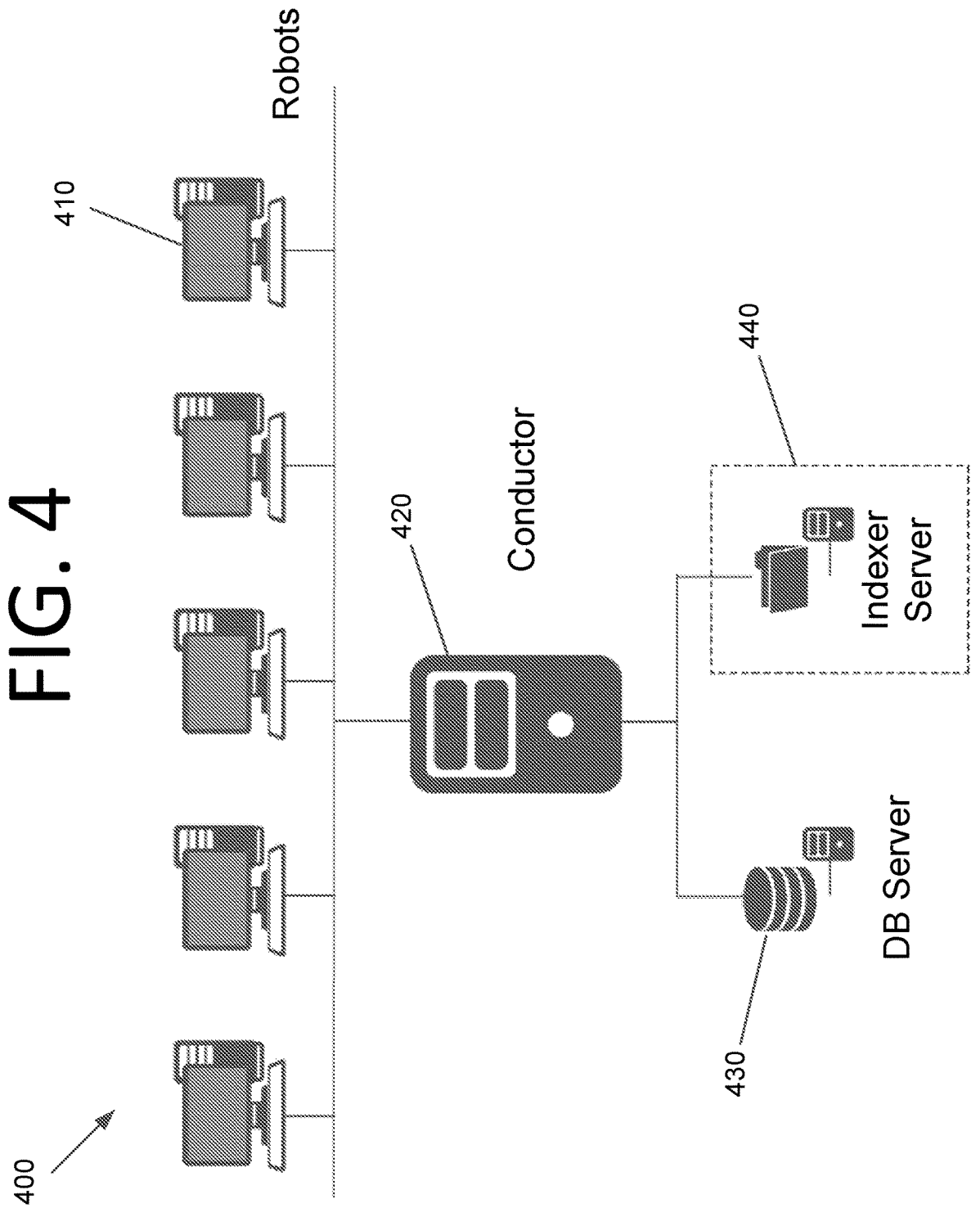
FIG. 4 is an architectural diagram illustrating an RPA system, according to an embodiment of the present inven-tion.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

FIG. 5 is an architectural diagram illustrating a computing system 500 configured to perform robot access control and governance for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a robot access control and governance module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
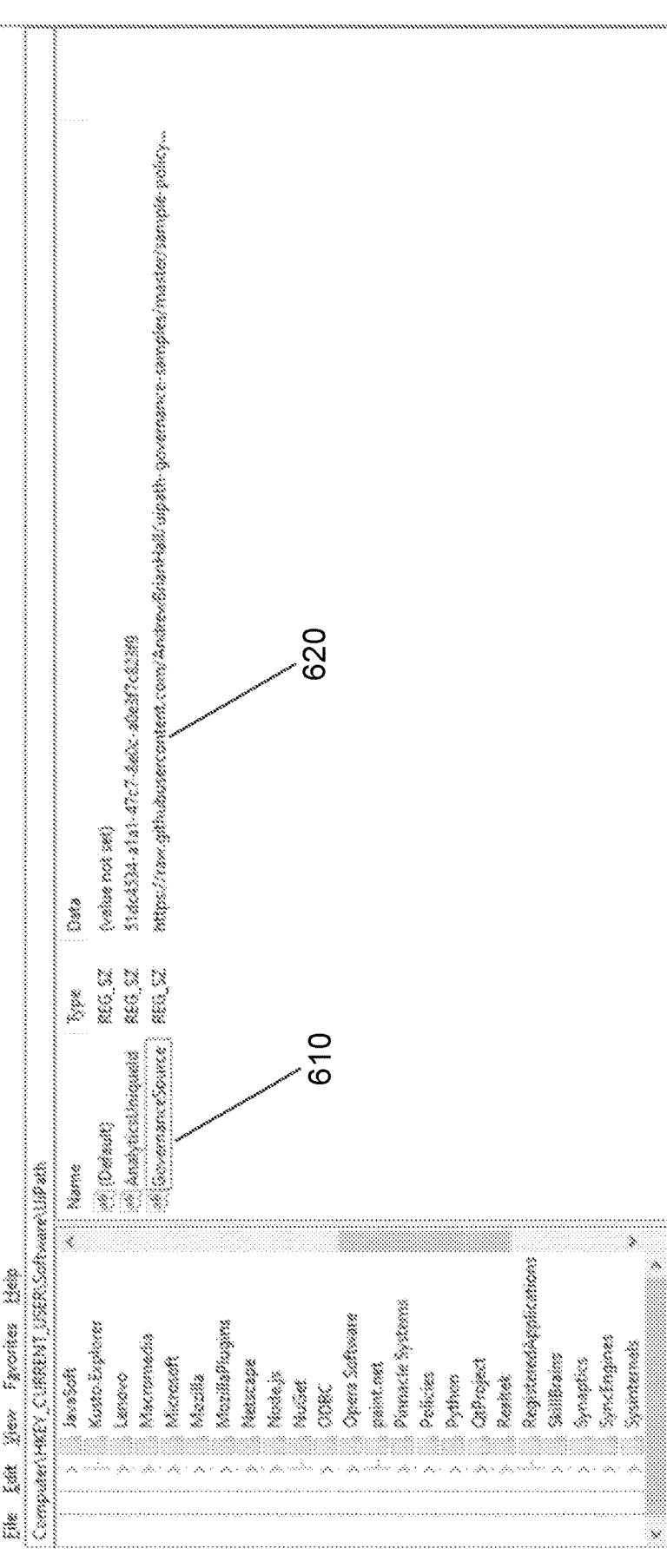
FIG. 6 is a screenshot illustrating a view of a folder of the Windows® Registry Editor for UiPath Studio™, according to an embodiment of the present invention.

In some embodiments, the governance information for the RPA designer application may be stored in a file that cannot be edited by the RPA developer. For instance, FIG. 6 is a screenshot illustrating a view of a folder 600 of the Windows® Registry Editor 600 for the RPA designer application (in this case, UiPath Studio™) Under the path Computer\HKEY_CURRENT_USER\Software\UiPath, a registry key named GovernanceSource 610 is set (e.g. when the RPA designer application is installed) that points to a remote policy file available via an associated link 620. The policy available at this link may be read only to the computing system and will be used by the RPA designer application or the RPA robot to govern certain permissions. This policy may be defined at the individual user level, group level, role level, organization level, etc. By including the policy via a remote link, updates to the policy can be made whenever desired, and the updated policy will be automatically accessed by consuming RPA robots and/or RPA designer applications. In this example, the policy file provides the ability to define different sets of policies for the development profile. In some embodiments, different policies may be set for experienced programmers and for citizen developers who may not have programming knowledge since these developers may have different needs. A portion of an example policy file for UiPath Studio™ that defines rules for development users, business users, and StudioPro users is included below. The sections in bold specify where additional rules or counters may be defined in this example.

```
{
    "Metadata": {
        "Version": "1.0",
    },
    "Info": {
        "Name": "Sample Policy Registry Key"
    },
    "Profiles": {
        "Development": {
            "Shell": {
                "IsFeedbackEnabled": true,
                "HideGettingStartedScreen": false
            },
            "SourceControl": {
                "CheckInBeforePublish": false
            },
            "Workflow": {
                "DockedAnnotations": true,
                "AnalyzeOnPublish": false,
                "AnalyzeOnRun": false
            }
            "PackageManager": {
                "AllowAddRemoveFeeds": false,
                "AllowEnableDisableFeeds": false,
                "AllowOrchestratorFeeds": true,
                "Feeds": [
                    {
                        "Name": "Local",
                        "Source": "C:\\Program Files
                        (x86)\\UiPath\\Studio\\Packages",
                        "IsEnabled": true
                    },
                    {
                        "Name": "Official",
                        "Source": "https://www.myget.org/F/workflow/",
                        "IsEnabled": true
                    },
                    {
                        "Name": "Connect",
                        "Source": "https://gallery.uipath.com/api/v2",
                        "IsEnabled": true
                    }
                ]
            },
            "Analyzer": {
                "AllowEdit": false,
                "ReferencedRulesConfigFile": null,
                "EmbeddedRulesConfig": {
                    "Rules": [
                        {
                            "Id": "ST-NMG-001",
                            "IsEnabled": true,
                            "Parameters": [
                                {
                                    "Name": "Regex",
                                    "Value": null
                                }
                            ],
                            "ErrorLevel": "Off"
                        },
                        <ADDITIONAL RULES DEFINED HERE>
                    ],
                    "Counters": [
                        {
                            "Id": "ST-NMG-001",
                            "IsEnabled": true,
                            "Parameters": [ ]
                        },
                        <ADDITIONAL COUNTERS DEFINED HERE>
                    ]
                }
            }
```

-continued

```
        },
        "Business": {
            "Shell": {
                "IsFeedbackEnabled": true,
                "HideGettingStartedScreen": false
            },
            "SourceControl": {
                "CheckInBeforePublish": false
            },
            "Workflow": {
                "DockedAnnotations": true,
                "AnalyzeOnPublish": false,
                "AnalyzeOnRun": false
            },
            "PackageManager": {
                "AllowAddRemoveFeeds": false,
                "AllowEnableDisableFeeds": false,
                "AllowOrchestratorFeeds": true,
                "Feeds": [
                    {
                        "Name": "Local",
                        "Source": "C:\\Program Files
                        (x86)\\UiPath\\Studio\\Packages",
                        "IsEnabled": true
                    },
                    {
                        "Name": "Official",
                        "Source": "https://www.myget.org/F/workflow/",
                        "IsEnabled": true
                    },
                    {
                        "Name": "Connect",
                        "Source": "https://gallery.uipath.com/api/v2",
                        "IsEnabled": true
                    }
                ]
            },
            "Analyzer": {
                "AllowEdit": false,
                "ReferencedRulesConfigFile": null,
                "EmbeddedRulesConfig": {
                    "Rules": [
                        {
                            "Id": "ST-NMG-001",
                            "IsEnabled": true,
                            "Parameters": [
                                {
                                    "Name": "Regex",
                                    "Value": null
                                }
                            ],
                            "ErrorLevel": "Off"
                        },
                        <ADDITIONAL RULES DEFINED HERE>
                    ],
                    "Counters": [
                        {
                            "Id": "ST-NMG-001",
                            "IsEnabled": true,
                            "Parameters": [ ]
                        },
                        <ADDITIONAL COUNTERS DEFINED HERE>
                    ]
                }
            }
        },
        "StudioPro": {
            "Shell": {
                "IsFeedbackEnabled": true,
                "HideGettingStartedScreen": false
            },
            "SourceControl": {
                "CheckInBeforePublish": false
```

-continued

```
    },
    "Workflow": {
        "DockedAnnotations": true,
        "AnalyzeOnPublish": false,
        "AnalyzeOnRun": false
    },
    "PackageManager": {
        "AllowAddRemoveFeeds": false,
        "AllowEnableDisableFeeds": false,
        "AllowOrchestratorFeeds": true,
        "Feeds": [
            {
                "Name": "Local",
                "Source": "C:\\Program Files
                (x86)\\UiPath\\Studio\\Packages",
                "IsEnabled": true
            },
            {
                "Name": "Official",
                "Source": "https://www.myget.org/F/workflow/",
                "IsEnabled": true
            },
            {
                "Name": "Connect",
                "Source": "https://gallery.uipath.com/api/v2",
                "IsEnabled": true
            }
        ]
    },
    "Analyzer": {
        "AllowEdit": false,
        "ReferencedRulesConfigFile": null,
        "EmbeddedRulesConfig": {
            "Rules": [
                {
                    "Id": "ST-NMG-001",
                    "IsEnabled": true,
                    "Parameters": [
                        {
                            "Name": "Regex",
                            "Value": null
                        }
                    ],
                    "ErrorLevel": "Off"
                },
                <ADDITIONAL RULES DEFINED HERE>
            ],
            "Counters": [
                {
                    "Id": " ST-NMG-001",
                    "IsEnabled": true,
                    "Parameters": [ ]
                },
                <ADDITIONAL RULES DEFINED HERE>
            ]
        }
    }
}
```

It should be noted that while the rules and counters shown here are the same for each user type, this need not necessarily be the case, and typically would not be in a practical implementation. It should also be noted that while a file including control and governance policy rules is obtained using a registry entry in some embodiments, in certain embodiments, the file or other policy information format is delivered by a conductor application. In certain embodiments, a server UI allows an administrator to define the policy, which will be delivered via a connection (e.g., as a .json payload). However, this policy may not necessarily be "a file" that the administrator explicitly authors in some embodiments.

Figure 7:
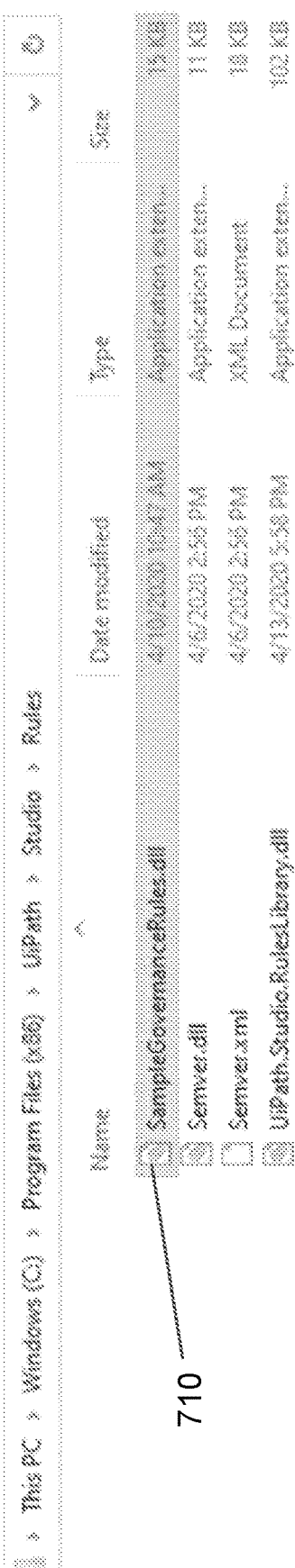
FIG. 7 is a screenshot illustrating a portion of a Windows Explorer® UI in which the file SampleGovernanceRules.dll is installed in the Rules folder for UiPath Studio™, according to an embodiment of the present invention.

In some embodiments, custom governance rules may be developed as part of a workflow analyzer process. For instance, in some embodiments, the installation script for the RPA designer application may install the custom governance rules to the user's computing system. See, for instance, screenshot 700 of FIG. 7 which shows a portion of a Windows Explorer® UI, in which the file SampleGovernanceRules.dll 710 is installed in the Rules folder for UiPath Studio™. Because SampleGovernanceRules.dll 710 is located in the Program Files folder, only an administrator may modify it. An end user without administrative privileges on his or her machine cannot. Thus, the end user without such privileges will have the governance policy and will not be able to override or change it.

Figure 8:
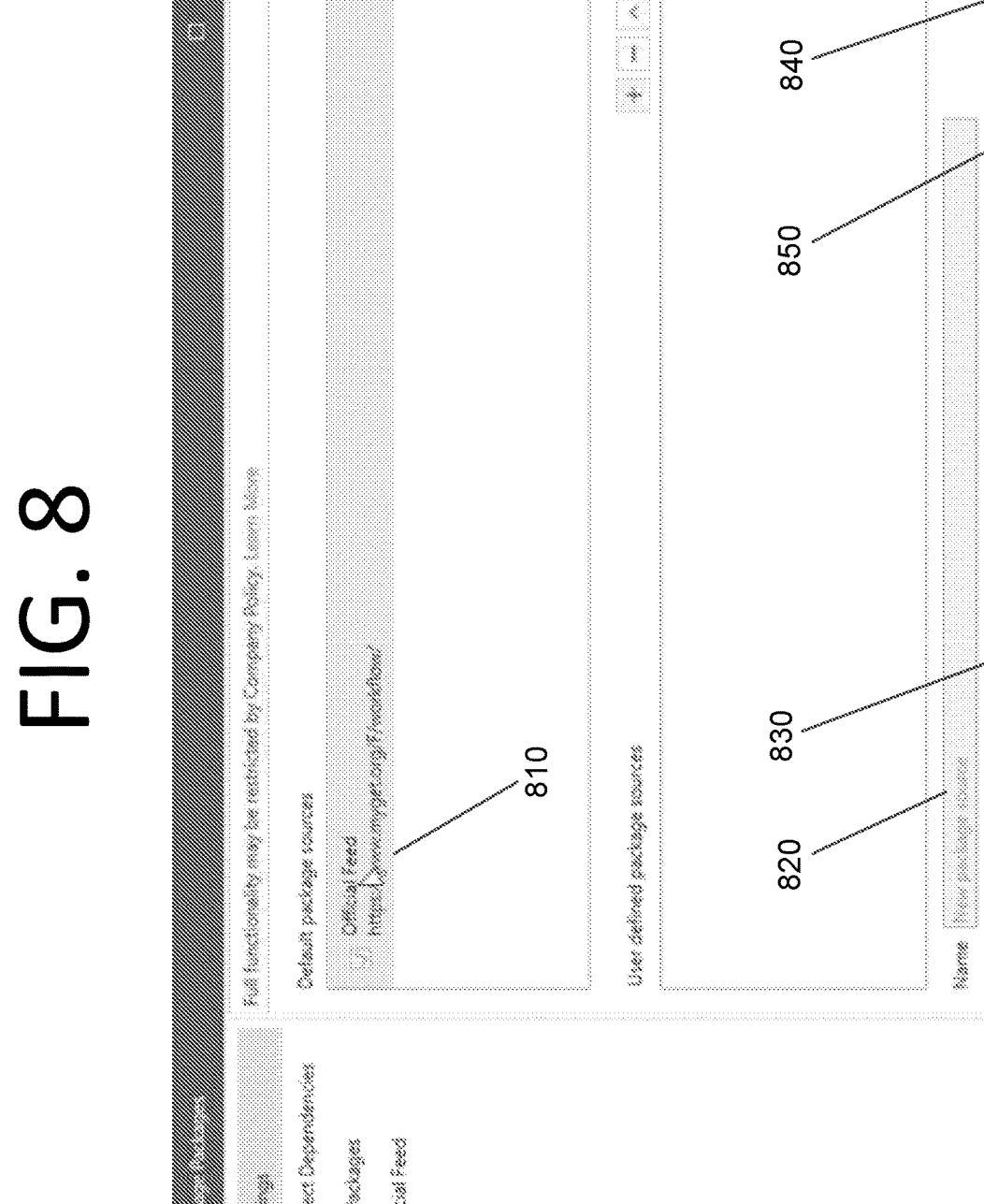
FIG. 8 is a screenshot illustrating a package management interface, according to an embodiment of the present invention.

FIG. 8 is a screenshot illustrating a package management interface 800, according to an embodiment of the present invention. In this embodiment, the package feeds for the developer have been locked down. More specifically, the developer only has access to official package feed 810, and the developer cannot enable or disable official package feed 810. The developer also cannot enter a name 820 or source 830 for a user-defined package, use add button 840 to add the user-defined package, or use save button 850 to save modified package settings. This prevents developers from getting activity packages from anywhere that the organization does not want them to.

Figure 9:
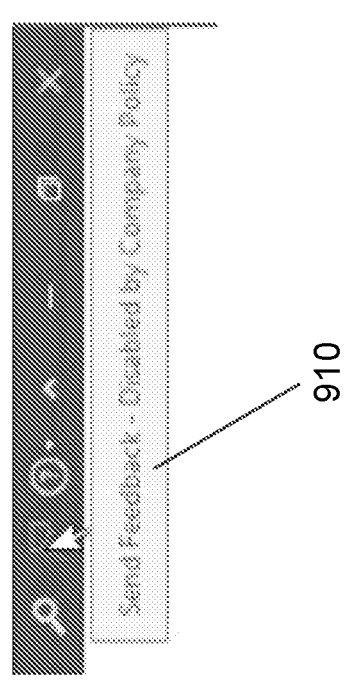
FIG. 9 is screenshot illustrating an upper right portion of an RPA designer application with the send feedback icon disabled, according to an embodiment of the present invention.

Some organizations may have concerns about developers potentially leaking sensitive information to the provider of the RPA designer application during development. Accordingly, in some embodiments, the send feedback functionality is disabled in the RPA designer application as a matter of policy. See, for example, FIG. 9, which is screenshot illustrating an upper right portion 900 of an RPA designer application with the send feedback icon disabled and a message 910 indicating that this is the case.

Figure 10A:
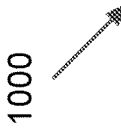
FIGS. 10A-D are screenshots illustrating a workflow analyzer settings interface, according to an embodiment of the present invention.

FIG. 10A is a screenshot illustrating a workflow analyzer settings interface 1000, according to an embodiment of the present invention. In some embodiments, the workflow analyzer settings are taken from a policy configuration file. As can be seen in FIG. 10A, various rules are listed in a rules pane 1002 with a respective code, name, scope, and default action. Specific settings options for a selected rule are shown in a rule settings pane 1004.

Figure 10B:
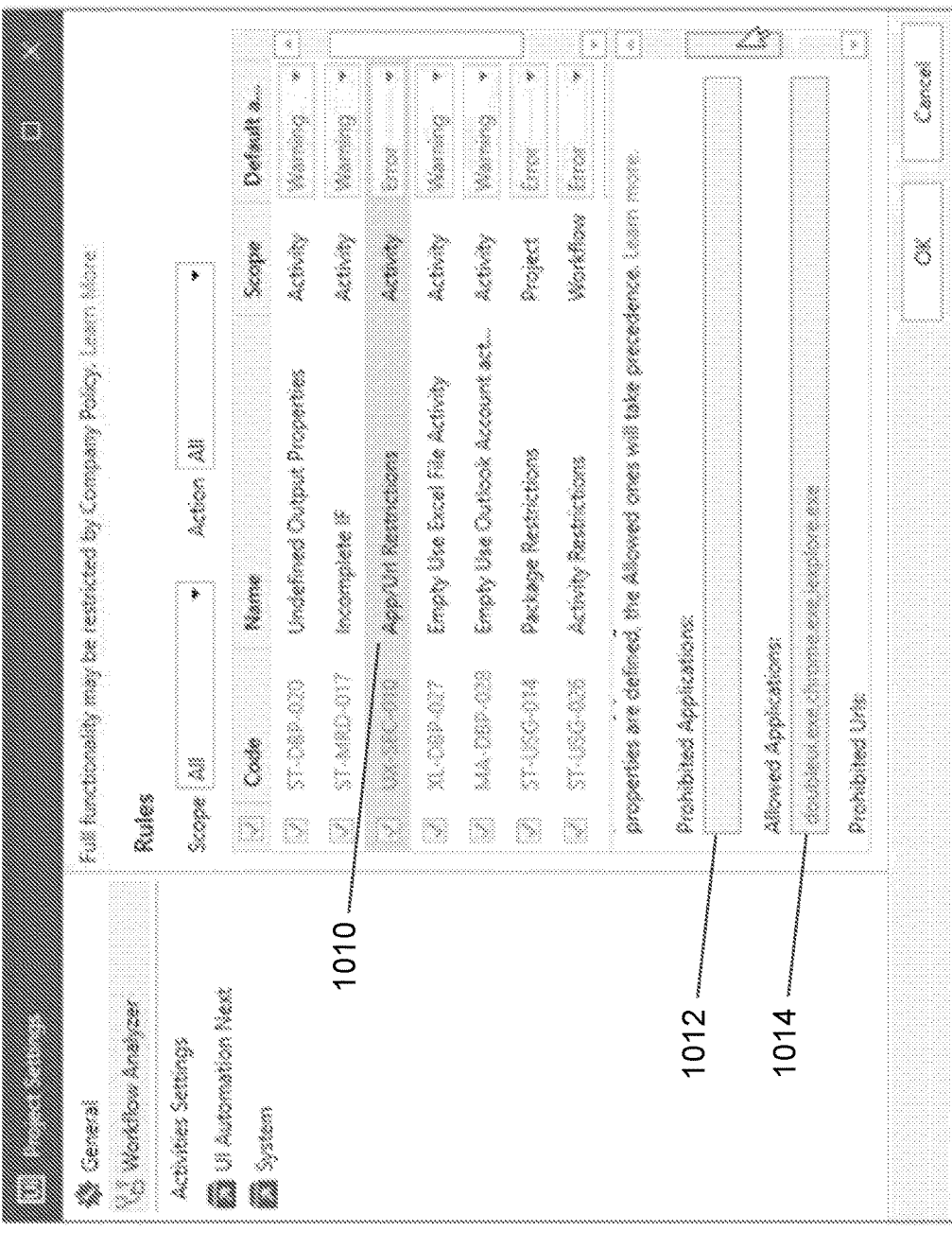

In this embodiment, there are four types of access restrictions—app/URL restrictions 1010, package restrictions 1020, activity restrictions 1030, and activity property requirements 1040. However, any number and/or type of access restrictions may be used without deviating from the scope of the invention. App/URL restrictions 1010 control which applications and/or URLs a user of the RPA designer application is and/or is not allowed to work with. For instance, with reference to FIG. 10B, prohibited applications would be shown in prohibited applications field 1012 if any were prohibited and allowed applications are shown in allowed applications field 1014. If the user scrolled down, prohibited URLs and allowed URLs would also be shown in respective fields. Naturally, a given application or URL cannot be both prohibited (i.e., blacklisted) and allowed (i.e., whitelisted). In certain embodiments, if allowed applications are specified, the user may only work with those applications. In this embodiment, these fields are read only.

Figure 10C:
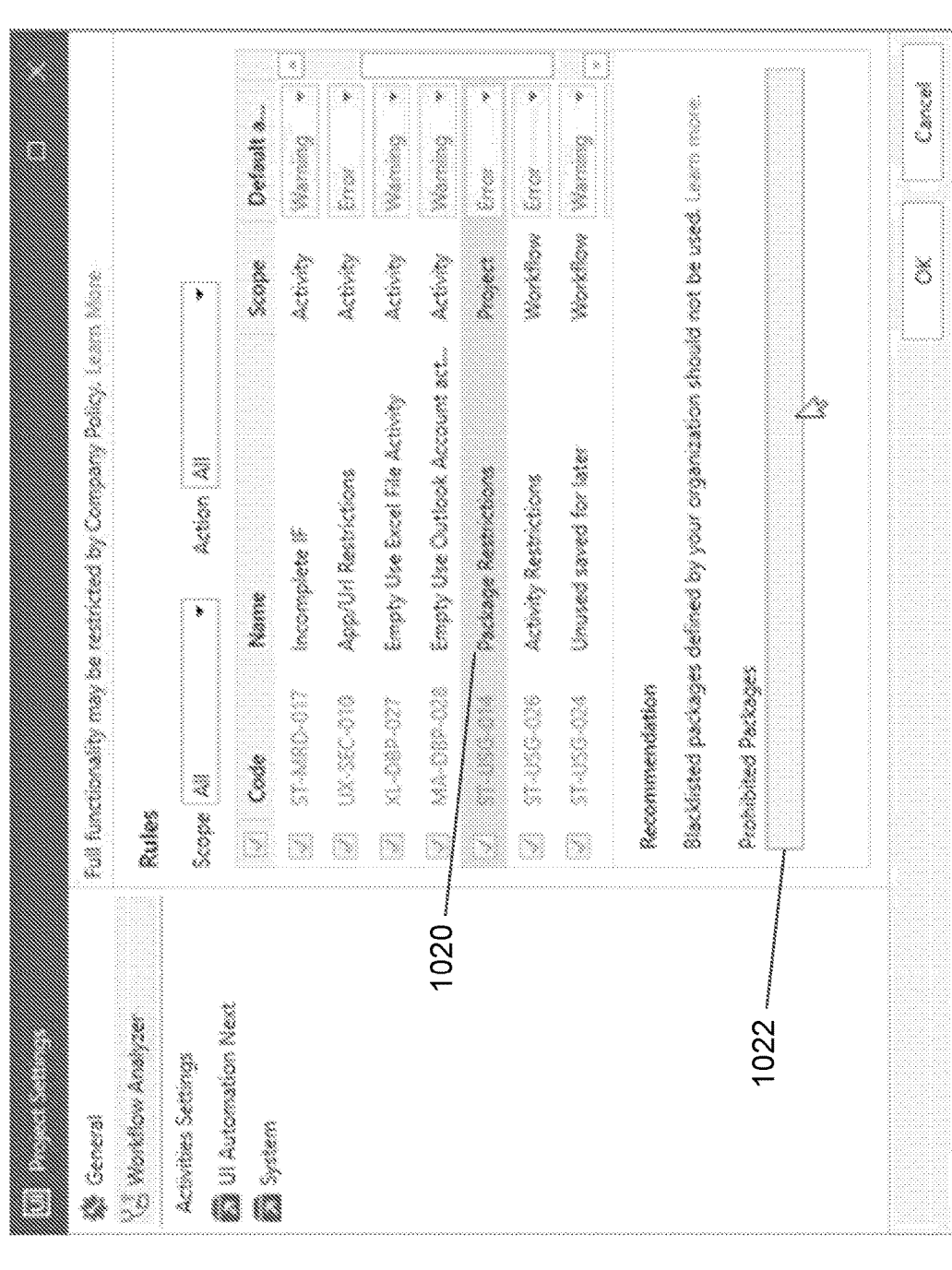

Package restrictions 1020 control which packages are prohibited. For instance, with reference to FIG. 10C, prohibited packages may be listed in prohibited packages field 1022. This may restrict categories of packages that the organization does not want a user to have access to in some embodiments. In certain embodiments, allowed packages may be listed in addition to or in lieu of prohibited packages field 1022. Prohibited packages field 1022 is read only in this embodiment.

Figure 10D:
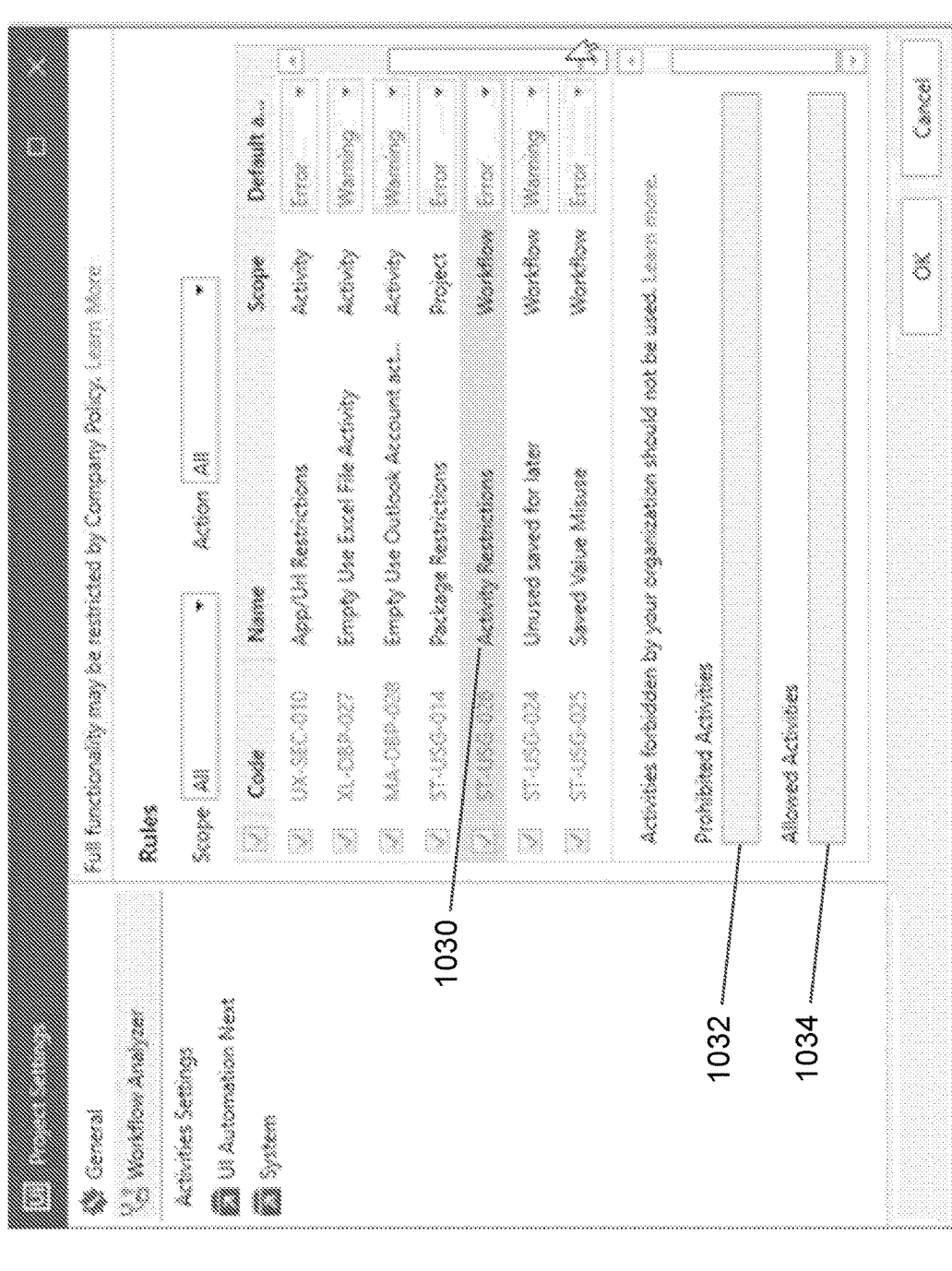

Activity restrictions 1030 control which activities the user is and/or is not allowed to use. For instance, with reference to FIG. 10D, prohibited activities would be shown in prohibited activities field 1032 if any were prohibited and allowed activities would be shown in allowed activities field 1034 if any activities were listed as allowed. Thus, if restrictions are not desired at the level of an entire package, but there are certain activities that should not be permitted and/or only certain activities should be allowed, this can be specified via activity restrictions 1030. In this embodiment, these fields are read only.

In some embodiments, if no activities are specified as being allowed and/or disallowed, this defaults to all activities being allowed. In certain embodiments, only allowed or disallowed is enforced, but not both. For instance, in such embodiments, if both allowed and disallowed activities are included, the "allowed" set may take precedence and the disallowed set may be ignored since specifically specifying allowed activities is considered more restrictive.

Activity property requirements 1040 allow an organization to define custom rules. Returning to FIG. 10A, a rule configuration field 1042 has a value of "Property:*Draft*, Activity:*MailX,Value:True". In this example, for MailX activities that work with Outlook® in UiPath StudioX™, they have to have the Draft properties set to True. As with the other restriction types, rule configuration field 1042 is read only for the user. As can be seen in FIGS. 10A-D, some rules are set to provide errors as a default action and others are set to provide warnings.

Figure 11:
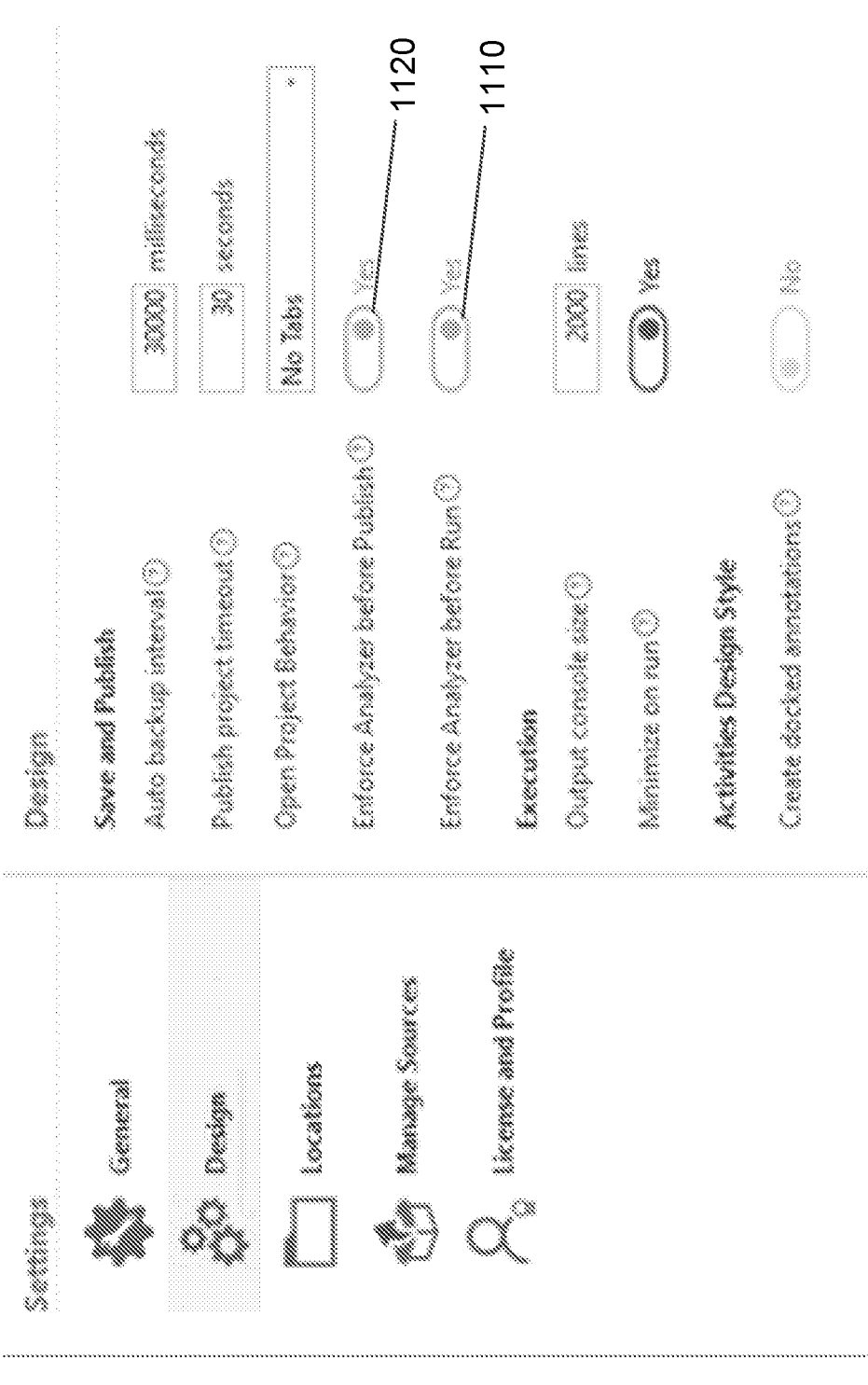
FIG. 11 is a screenshot illustrating an RPA designer application settings interface, according to an embodiment of the present invention.

As shown in the screenshot of FIG. 11, in RPA designer application settings interface 1100, various settings can be enforced for the RPA workflow design. In this case, the workflow has to pass the workflow analyzer both before run and before publish. This enforcement can be seen in settings 1110 and 1120, respectively. This means that for the governance policies set as rules in workflow analyzer settings interface 1000, the workflow must comply with all rules that are set to throw an error in the case of noncompliance.

Figure 12A:
FIGS. 12A and 12B are screenshots illustrating an RPA workflow, according to an embodiment of the present invention.
Figure 12B:

FIGS. 12A and 12B are screenshots illustrating an RPA workflow 1200, according to an embodiment of the present invention. The user is trying to automate the content at link 1210. Consider the case that this is not a permitted URL based on the rules of the workflow analyzer. Also consider the case that a rule exists requiring "save as draft" checkbox 1220 to be selected. When the user seeks to validate the workflow, an error list interface 1300 appears in this embodiment. See FIG. 13. Error list interface 1300 indicates that the "save as draft" property does not meet the organization's guidelines and that https://www.uipath.com/ is not an allowed application defined by the organization for UI automation.

Per the above, policies may be defined based on the technical sophistication of the user in some embodiments. For example, more complex rules may be defined for UiPath Studio™, which tends to be used by RPA developers with programming knowledge, than UiPath StudioX™, which may be used by individuals of any level of programming knowledge or even the lack thereof. For instance, users of an RPA designer application that are more technically sophisticated may have access to more package feeds, have the ability to disable feeds, have a richer set of rules, etc.

Consider workflow analyzer interface 1400 of FIG. 14. In this case, a rich set of rules is provided for an RPA developer, including custom rules. A custom package version requirements rule 1410 is implemented. The mail activities "UiPath.Mail.Activities" must have a minimum version of 1.6.0 and a maximum version of 1.6.0 in rule configuration field 1412, and an error will be thrown if another version is referenced. This requires that UiPath.Mail.Activities must have exactly this version. Also, allow prerelease packages field 1414 is set to "True."

Per the above, in some embodiments, governance is enabled as part of an installation script for an RPA designer application. In certain embodiments, a remote policy file may be set via a registration key so that the RPA designer application always has the current version of the governance policies. Alternatively, the policy file may be in a protected location on the local computing system on which the RPA designer application resides. In some embodiments, custom rules are deployed to a protected "rules" folder as part of the installation script.

In some embodiments, separate policies are enforced for technically savvy users and users without substantial programming knowledge. In certain embodiments, different policies are applied based on a given user, the user's role, the user's group, etc. In some embodiments, users cannot run or publish noncompliant RPA workflows.

Figure 15:
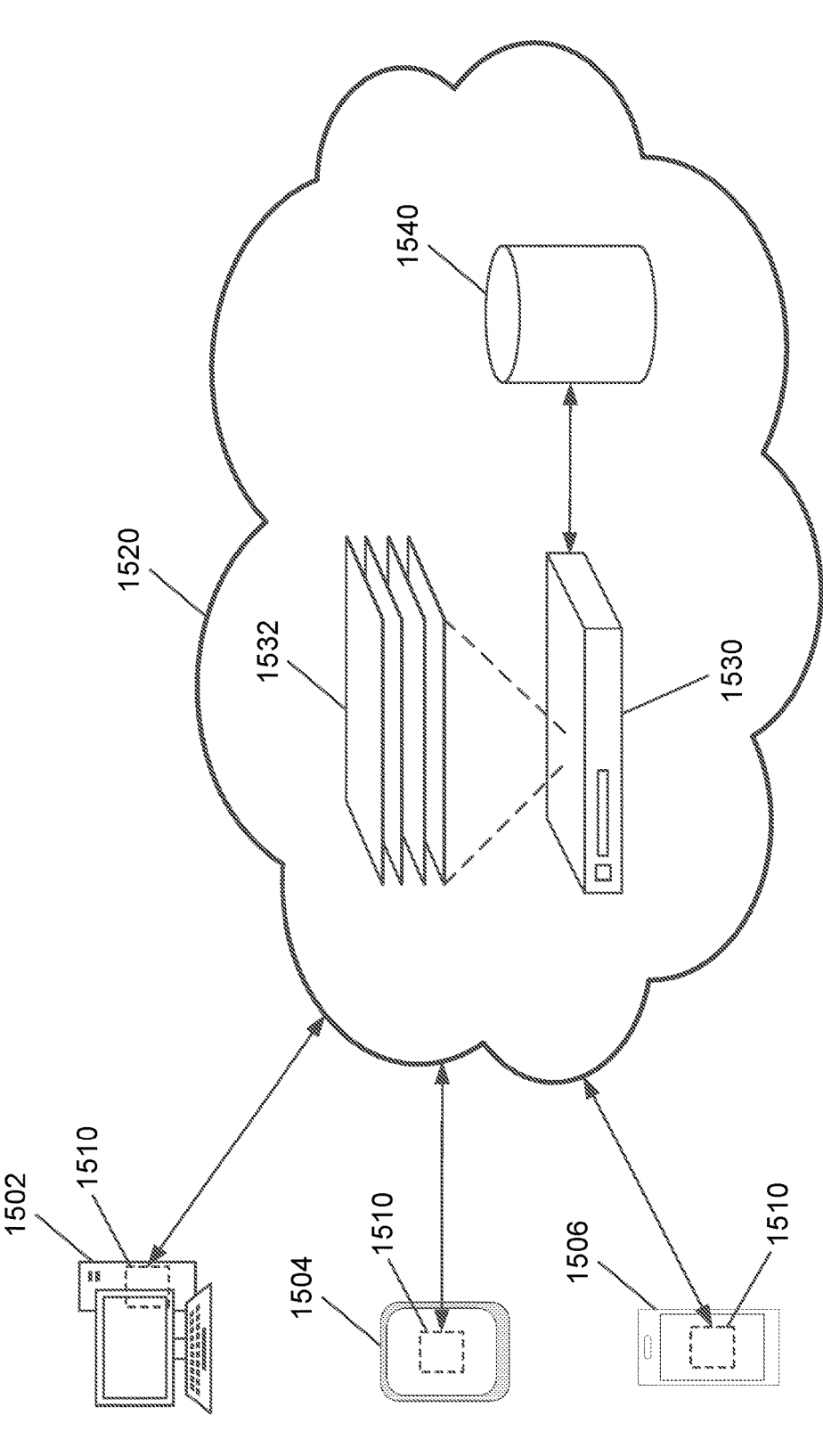
FIG. 15 is an architectural diagram illustrating a system for performing access control and governance for RPA at robot execution, according to an embodiment of the present invention.

FIG. 15 is an architectural diagram illustrating a system 1500 for performing access control and governance for RPA at robot execution, according to an embodiment of the present invention. System 1500 includes user computing systems, such as desktop computer 1502, tablet 1504, and smart phone 1506. However, any desired computing system may be used without deviating from the scope of invention including, but not limited to, smart watches, laptop computers, Internet-of-Things (IoT) devices, vehicle computing systems, etc.

Each computing system 1502, 1504, 1506 has an RPA robot 1510 running thereon that executes one or more automations. However, in certain embodiments, computing systems 1502, 1504, 1506 may execute different robots. When executing its process, the RPA robot requests certain information from a server 1530 (e.g. sending requests to a conductor application running on server 1530) via a network 1520 (e.g., a local area network (LAN), a mobile communications network, a satellite communications network, the Internet, any combination thereof, etc.). For instance, RPA robot 1510 may communicate with server 1530 to send or receive data (e.g., pushing/pulling from a data queue), retrieve securely stored credential/asset information (e.g., usernames/passwords, access tokens, etc.), log information from the activities (e.g., execution logs), report "heartbeat status" (e.g., that RPA robot 1510 is running correctly), check for "orchestration commands" (e.g., "run this", "abort/cancel execution", etc.), or any other suitable communications without deviating from the scope of the invention. In some embodiments, server 1530 may run the conductor application and the data may be sent periodically as part of the heartbeat message. Server 1530 obtains access control and governance rules for a given robot from one or more files 1532, from a database 1540, or both.

Server 1530 checks the action(s) to be performed by robot 1510 and/or the information requested by the RPA robot against the access control and governance rules. If robot 1510 is permitted to take the action or obtain the information, server 1530 provides the requested information to robot 1510 and/or sends information to a validation application on the respective computing system indicating that the action is acceptable. If not, server 1530 does not provide the requested information to robot 1510 and/or sends information to the validation application on the respective computing system indicating that the action attempted by robot 1510 is not acceptable. In certain embodiments, the validation application may end the process associated with robot 1510.

In some embodiments, the action that is not permitted may be an action permitted for a human user but not an RPA robot. In certain embodiments, server 1530 may verify that robot 1510 pauses long enough for one or more legacy systems and may delay obtaining the information requested by the robot or accepting new information requests from the robot until the delay period expires. In certain embodiments, governance is enforced at runtime in addition to design time enforcement. Policies may be automatically sent to computing systems 1502, 1504, 1506 in some embodiments when computing systems 1502, 1504, 1506 connect to a server-side conductor application of server 1530, for example. The RPA designer application may automatically insert code into the RPA robots that forces them to obtain these policies and operate in compliance therewith in some embodiments.

Figure 16:
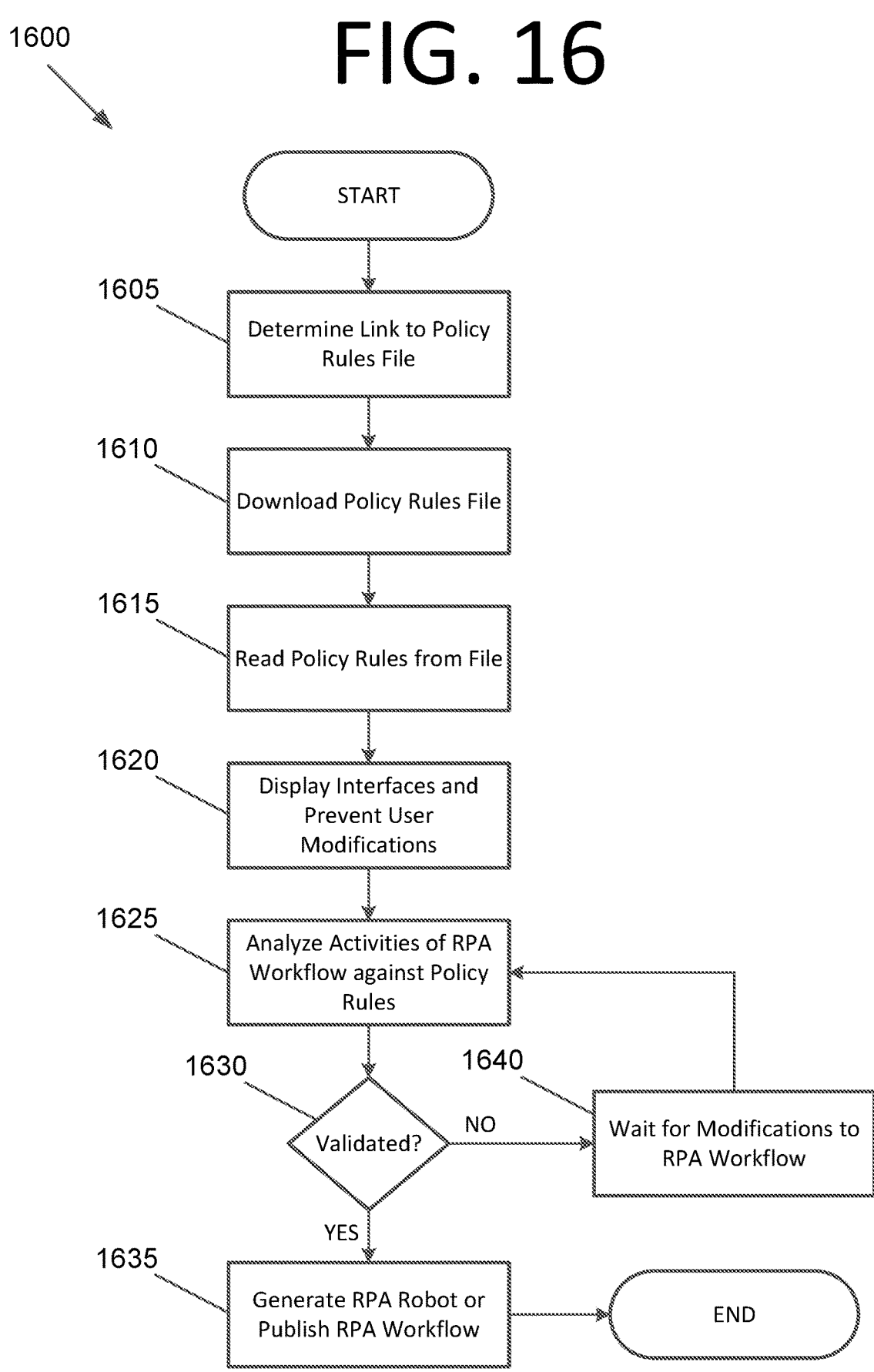
FIG. 16 is a flowchart illustrating a process for performing robot access control and governance for an RPA designer application, according to an embodiment of the present invention.

FIG. 16 is a flowchart illustrating a process 1600 for performing robot access control and governance for an RPA designer application, according to an embodiment of the present invention. The process begins with determining a link to a file including access control and governance policy rules from a registry entry of a computing system at 1605 and downloading the file using the determined link at 1610. In some embodiments, the access control and governance policy rules are implemented via an installation script for the RPA designer application. A workflow analyzer reads the access control and governance policy rules for the RPA designer application from the file at 1615.

In some embodiments, the access control and governance policy rules include controls on which applications and/or URLs may and/or may not be automated, controls on what activities may and/or may not be used in the RPA workflow, controls on what packages may and/or may not be used for the RPA workflow, or a combination thereof. In certain embodiments, the access control and governance policy rules are defined for the RPA designer application based on an organization, a role, a group, an individual developer, or a combination thereof. In some embodiments, the access control and governance policy rules cannot be modified by a user of the RPA designer application as enforced by an operating system of a computing system on which the RPA designer application is executed. In certain embodiments, the access control and governance policy rules include one or more application and/or URL restrictions, one or more package restrictions, one or more activity restrictions, one or more activity property requirements, or a combination thereof.

In some embodiments, various interfaces may be displayed and unpermitted user modifications may be prevented at 1620. For instance, a package management interface including packages that may be accessed by the activities of an RPA workflow may be displayed and a user of the RPA designer application may be prevented from modifying the permitted packages or adding new packages that are not permitted based on the access control and governance policy rules. As another example, a workflow analyzer settings interface may be displayed that lists the access control and governance policy rules and the user of the RPA designer application may be prevented from modifying the access control and governance policy rules.

Activities of the RPA workflow of the RPA designer application are analyzed against the access control and governance policy rules at 1625. In some embodiments, the analysis of the activities of the RPA workflow includes verifying whether one or more libraries to be accessed in an RPA workflow activity are included in a whitelist or not included in a blacklist. If the validation succeeds at 1630 (i.e., the RPA workflow activities comply with all required access control and governance policy rules), an RPA robot implementing the RPA workflow is generated or the RPA workflow is published at 1635. However, if the validation fails at 1630 (i.e., one or more analyzed activities of the RPA workflow violate the access control and governance policy rules), generation of an RPA robot or publication of the RPA workflow is prevented until the RPA workflow satisfies the access control and governance policy rules. In this embodiment, the RPA workflow analyzer/RPA designer application wait for the user to make modifications to the RPA workflow at 1640. The process then returns to step 1625 to analyze the modified activities of the RPA workflow. In some embodiments, only the activities that have been modified are analyzed again.

Figure 17:
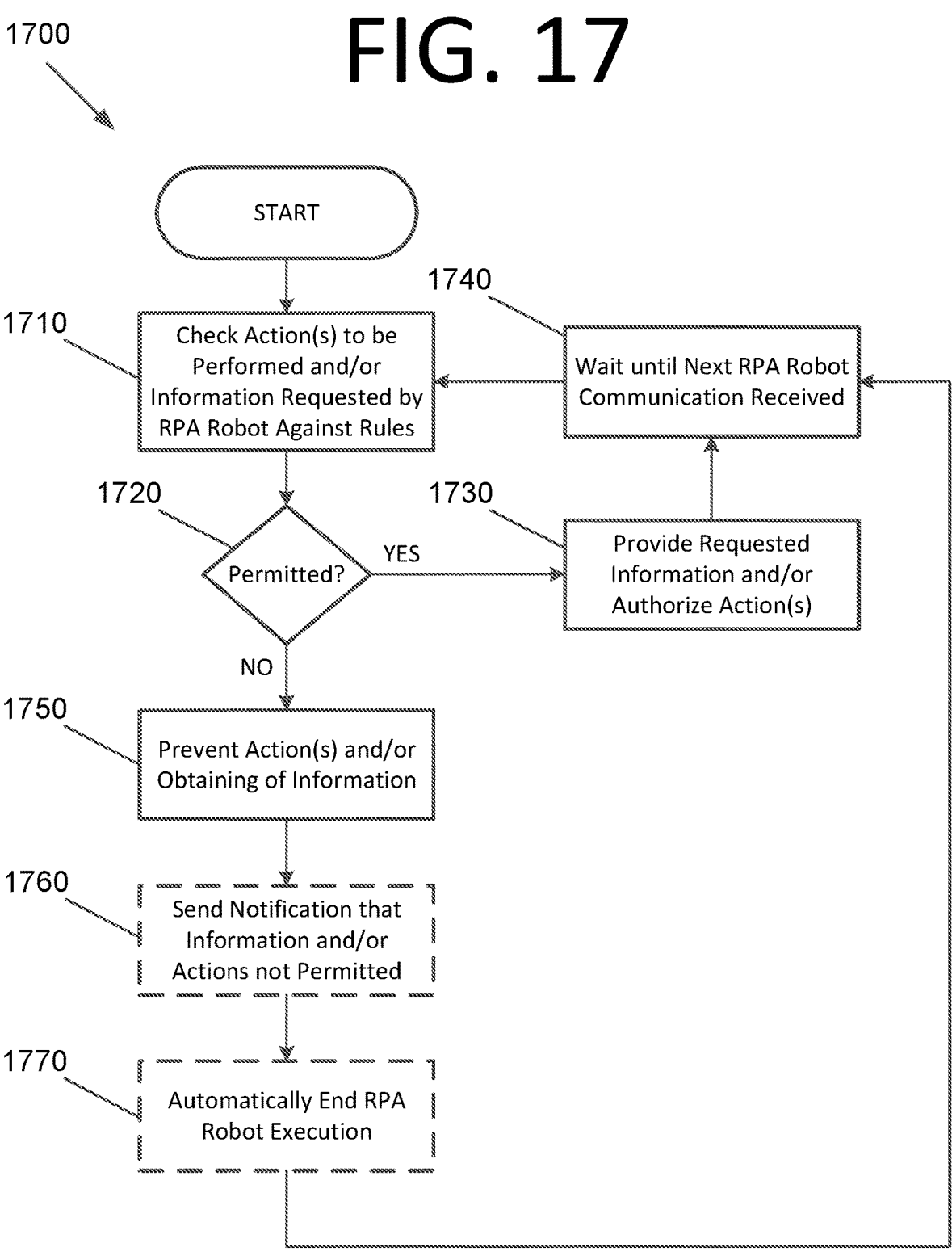
FIG. 17 is a flowchart illustrating a process for performing robot access control and governance for RPA for an executing RPA robot, according to an embodiment of the present invention.

FIG. 17 is a flowchart illustrating a process 1700 for performing robot access control and governance for RPA for an executing RPA robot, according to an embodiment of the present invention. The process begins with checking action(s) to be performed by an RPA robot and/or information requested by the RPA robot against access control and governance rules at 1710. The check may be performed by a client-side or a server-side validation application, for example. If the RPA robot is permitted to take the action(s) and/or obtain the information at 1720, the requested information is provided to the RPA robot and/or the action(s) are authorized at 1730. The validation application then waits until a next RPA robot communication is received at 1740.

If the RPA robot is not permitted to take the action(s) and/or obtain the information at 1720, the validation application prevents the RPA robot from obtaining the information and/or taking the action(s) at 1750. In some embodiments, a notification may be sent to the RPA robot that access to the information and/or the action(s) are not permitted at 1760. In certain embodiments, the validation application may automatically end execution of the RPA robot (e.g., by terminating a process associated with the RPA robot) at 1770. The In some embodiments, the action that is not permitted may be an action permitted for a human user but not an RPA robot. In certain embodiments, the validation application may verify that the RPA robot pauses long enough for one or more legacy systems and may delay obtaining the information requested by the RPA robot or accepting new information requests from the RPA robot until the delay period expires.

The process steps performed in FIGS. 16 and 17 may be performed by a computer program, encoding instructions for the processor(s) to perform at least part of the process(es) described in FIGS. 16 and 17, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 16 and 17, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. One or more non-transitory computer-readable media storing a computer program for performing access control and governance for automation, the computer program configured to cause at least one processor to:

display a package management interface comprising packages that may be accessed by activities of a workflow of a designer application;

prevent a user of the designer application from modifying permitted packages or adding new packages that are not permitted based on access control and governance policy rules;

analyze the activities of the workflow of the designer application against the access control and governance policy rules by running a series of rules that inspect the activities of the workflow, the workflow comprising an execution order and a relationship between the activities;

responsive to one or more analyzed activities of the workflow violating the access control and governance policy rules, prevent generation of the automation or publication of the workflow until the workflow satisfies the access control and governance policy rules; and responsive to the analyzed activities of the workflow complying with all required access control and governance policy rules, generate the automation implementing the workflow or publish the workflow, wherein the access control and governance policy rules cannot be modified by a user of the designer application.

2. The one or more non-transitory computer-readable media of claim 1, wherein responsive to the one or more analyzed activities of the workflow violating the access control and governance policy rules, the computer program is configured to cause the at least one processor to:

generate a notification corresponding to a severity specified in a governance policy.

3. The one or more non-transitory computer-readable media of claim 1, wherein an installation script for the designer application installs the access control and governance policy rules on a computing system.

4. The one or more non-transitory computer-readable media of claim 1, wherein the access control and governance policy rules comprise application and/or universal resource locator (URL) restrictions, package restrictions, activity restrictions, and activity property requirements.

5. The one or more non-transitory computer-readable media of claim 1, wherein the analysis of the activities of the workflow comprises verifying whether one or more libraries to be accessed in a workflow activity are included in a whitelist or not included in a blacklist.

6. The one or more non-transitory computer-readable media of claim 1, wherein the computer program instructions are further configured to cause the at least one processor to:

download the access control and governance policy rules from a conductor application.

7. The one or more non-transitory computer-readable media of claim 1, wherein the access control and governance policy rules comprise controls on which applications and/or universal resource locators (URLs) are automated, controls on what activities are used in the workflow, controls on what packages are used for the workflow, or a combination thereof.

8. The one or more non-transitory computer-readable media of claim 1, wherein the access control and governance policy rules are defined for the designer application based on an organization, a role, a group, an individual developer, or a combination thereof.

9. The one or more non-transitory computer-readable media of claim 1, wherein the computer program is further configured to cause the at least one processor to:

display a code analyzer settings interface that lists the access control and governance policy rules.

10. The one or more non-transitory computer-readable media of claim 1, wherein the access control and governance policy rules comprise one or more application and/or universal resource locator (URL) restrictions, one or more package restrictions, one or more activity restrictions, one or more activity property requirements, or a combination thereof.

11. A computer-implemented method for performing access control and governance for automation, comprising:

displaying a package management interface comprising packages that may be accessed by activities of a workflow, by a designer application;

preventing a user of the designer application from modifying permitted packages or adding new packages that are not permitted based on the access control and governance policy rules, by the designer application;

analyzing activities of the workflow of the designer application against the access control and governance policy rules by running a series of rules that inspect the activities of the workflow, by a code analyzer of a computing system, the workflow comprising an execution order and a relationship between the activities; and responsive to one or more analyzed activities of the workflow violating the access control and governance policy rules, preventing generation of the automation or publication of the workflow until the workflow satisfies the access control and governance policy rules, by the code analyzer of the computing system, wherein the code analyzer is computer code that automatically runs the access control and governance policy rules as a series of rules that inspect the code written by a user, and the access control and governance policy rules cannot be modified by a user of the designer application.

12. The computer-implemented method of claim 11, further comprising:

responsive to the analyzed activities of the workflow complying with all required access control and governance policy rules, generating the automation implementing the workflow or publishing the workflow, by the designer application.

13. The computer-implemented method of claim 11, wherein responsive to the one or more analyzed activities of the workflow violating the access control and governance policy rules, the method further comprises:

generating a notification corresponding to a severity specified in a governance policy, by the code analyzer of the computing system.

14. The computer-implemented method of claim 11, wherein the access control and governance policy rules comprise application and/or universal resource locator (URL) restrictions, package restrictions, activity restrictions, and activity property requirements.

15. The computer-implemented method of claim 11, wherein the access control and governance policy rules comprise controls on which applications and/or universal resource locators (URLs) are automated, controls on what activities are used in the workflow, controls on what packages are used for the workflow, or a combination thereof.

16. The computer-implemented method of claim 11, further comprising:

displaying a code analyzer settings interface that lists the access control and governance policy rules, by the designer application.

17. The computer-implemented method of claim 11, wherein the access control and governance policy rules comprise one or more application and/or universal resource locator (URL) restrictions, one or more package restrictions, one or more activity restrictions, one or more activity property requirements, or a combination thereof.

18. One or more computing systems, comprising:

memory storing computer program instructions for performing access control and governance for automation; and at least one processor configured to execute the computer program instructions, wherein the computer program instructions are configured to cause the at least one processor to:

display a package management interface comprising packages that may be accessed by activities of a workflow of a designer application;

prevent a user of the designer application from modifying permitted packages or adding new packages that are not permitted based on access control and governance policy rules;

analyze activities of the workflow of the designer application against the access control and governance policy rules by running a series of rules that inspect the activities of the workflow, the workflow comprising an execution order and a relationship between the activities;

responsive to one or more analyzed activities of the workflow violating the access control and governance policy rules, prevent generation of the automation or publication of the workflow until the workflow satisfies the access control and governance policy rules; and responsive to the analyzed activities of the workflow complying with all required access control and governance policy rules, generate the automation implementing the workflow or publish the workflow, wherein the access control and governance policy rules comprise one or more application and/or universal resource locator (URL) restrictions, one or more package restrictions, one or more activity restrictions, one or more activity property requirements, or a combination thereof, the access control and governance policy rules are defined for the designer application based on an organization, a role, a group, an individual developer, or a combination thereof, and the access control and governance policy rules cannot be modified by a user of the designer application.

19. The one or more computing systems of claim 18, wherein responsive to the one or more analyzed activities of the workflow violating the access control and governance policy rules, the computer program instructions are configured to cause the at least one processor to:

generate a notification corresponding to a severity specified in a governance policy.

20. The one or more computing systems of claim 18, wherein the analysis of the activities of the workflow comprises verifying whether one or more libraries to be accessed in a workflow activity are included in a whitelist or not included in a blacklist.

21. The one or more computing systems of claim 18, wherein the computer program instructions are further configured to cause the at least one processor to:

display a code analyzer settings interface that lists the
access control and governance policy rules.

* * * * *